(12) United States Patent
Karafin et al.

(10) Patent No.: US 11,221,670 B2
(45) Date of Patent: Jan. 11, 2022

(54) SYSTEM AND METHODS FOR REALIZING TRANSVERSE ANDERSON LOCALIZATION IN ENERGY RELAYS USING COMPONENT ENGINEERED STRUCTURES

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 16/063,832

(22) PCT Filed: Jul. 17, 2017

(86) PCT No.: PCT/US2017/042418
§ 371 (c)(1),
(2) Date: Jun. 19, 2018

(87) PCT Pub. No.: WO2018/014027
PCT Pub. Date: Jan. 18, 2018

(65) Prior Publication Data
US 2018/0372958 A1 Dec. 27, 2018

Related U.S. Application Data

(63) Continuation-in-part of application No. PCT/US2017/042275, filed on Jul. 14, 2017, and a
(Continued)

(51) Int. Cl.
*G02B 30/00* (2020.01)
*G02B 30/56* (2020.01)
(Continued)

(52) U.S. Cl.
CPC ............ *G06F 3/013* (2013.01); *G02B 3/0056* (2013.01); *G02B 3/08* (2013.01); *G02B 5/32* (2013.01);
(Continued)

(58) Field of Classification Search
CPC .............. G02B 6/2552; G02B 6/02042; G02B 6/03627; G02B 6/03644; G02B 6/03666;
(Continued)

(56) References Cited

U.S. PATENT DOCUMENTS

| 947,702 A | 1/1910 | Rowley |
| 3,505,046 A | 4/1970 | Phaneuf |

(Continued)

FOREIGN PATENT DOCUMENTS

| CN | 101095244 A | 12/2007 |
| CN | 102231044 A | 11/2011 |

(Continued)

OTHER PUBLICATIONS

International Search Report and Written Opinion dated Dec. 20, 2017 of corresponding PCT application No. PCT/US17/42418.
(Continued)

*Primary Examiner* — Rhonda S Peace
(74) *Attorney, Agent, or Firm* — Charles C. Yang

(57) ABSTRACT

Disclosed are systems and methods for manufacturing energy relays for energy directing systems and Transverse Anderson Localization. Systems and methods include providing first and second component engineered structures with first and second sets of engineered properties and forming a medium using the first component engineered structure and the second component engineered structure. The forming step includes randomizing a first engineered property in a first orientation of the medium resulting in a first variability of that engineered property in that plane, and
(Continued)

the values of the second engineered property allowing for a variation of the first engineered property in a second orientation of the medium, where the variation of the first engineered property in the second orientation is less than the variation of the first engineered property in the first orientation.

14 Claims, 14 Drawing Sheets

Related U.S. Application Data continuation-in-part of application No. PCT/US2017/042276, filed on Jul. 14, 2017.

(60) Provisional application No. 62/362,602, filed on Jul. 15, 2016, provisional application No. 62/366,076, filed on Jul. 24, 2016, provisional application No. 62/507,500, filed on May 17, 2017.

(51) Int. Cl.
| | |
|---|---|
| G02B 6/02 | (2006.01) |
| G02B 27/00 | (2006.01) |
| G02B 5/32 | (2006.01) |
| G02B 6/08 | (2006.01) |
| G02B 27/09 | (2006.01) |
| G02B 25/00 | (2006.01) |
| G03H 1/22 | (2006.01) |
| H04N 5/89 | (2006.01) |
| G02B 30/33 | (2020.01) |
| G02B 6/04 | (2006.01) |
| G02B 27/10 | (2006.01) |
| G10K 11/26 | (2006.01) |
| G21K 1/00 | (2006.01) |
| G02B 6/293 | (2006.01) |
| H04N 5/225 | (2006.01) |
| G02B 3/00 | (2006.01) |
| G02B 3/08 | (2006.01) |
| H04N 13/344 | (2018.01) |
| G06F 3/01 | (2006.01) |
| G02B 27/01 | (2006.01) |
| G03H 1/02 | (2006.01) |
| H04N 13/388 | (2018.01) |
| G03H 1/00 | (2006.01) |

(52) U.S. Cl.
CPC .......... *G02B 6/023* (2013.01); *G02B 6/02042* (2013.01); *G02B 6/02295* (2013.01); *G02B 6/04* (2013.01); *G02B 6/08* (2013.01); *G02B 6/29325* (2013.01); *G02B 25/00* (2013.01); *G02B 25/002* (2013.01); *G02B 27/0093* (2013.01); *G02B 27/0103* (2013.01); *G02B 27/0172* (2013.01); *G02B 27/0955* (2013.01); *G02B 27/0994* (2013.01); *G02B 27/1066* (2013.01); *G02B 27/1073* (2013.01); *G02B 30/00* (2020.01); *G02B 30/33* (2020.01); *G02B 30/56* (2020.01); *G03H 1/0005* (2013.01); *G03H 1/0248* (2013.01); *G03H 1/2202* (2013.01); *G03H 1/2294* (2013.01); *G06F 3/01* (2013.01); *G10K 11/26* (2013.01); *G21K 1/00* (2013.01); *H04N 5/22541* (2018.08); *H04N 5/89* (2013.01); *H04N 13/344* (2018.05); *H04N 13/388* (2018.05); *G02B 6/0229* (2013.01); *G02B 2027/0105* (2013.01); *G02B 2027/0134* (2013.01); *G02B 2027/0174* (2013.01); *G03H 2001/0088* (2013.01); *G03H 2223/19* (2013.01); *Y02E 10/52* (2013.01)

(58) Field of Classification Search
CPC ............ G02B 2006/12071; G02B 6/08; G02B 6/02366
See application file for complete search history.

(56) References Cited

U.S. PATENT DOCUMENTS

| | | | |
|---|---|---|---|
| 3,567,549 A | 3/1971 | Hoffmeister et al. | |
| 3,626,040 A | 12/1971 | Nagao et al. | |
| 3,870,399 A * | 3/1975 | Randall | G02B 6/06 385/123 |
| 3,961,931 A | 6/1976 | Nakagawa et al. | |
| 4,087,159 A * | 5/1978 | Ulrich | G02B 6/06 385/115 |
| 4,099,833 A | 7/1978 | Tosswill | |
| 4,134,642 A * | 1/1979 | Kapron | G02B 6/02042 385/12 |
| 4,143,234 A | 3/1979 | Johnson et al. | |
| 4,149,772 A * | 4/1979 | Iyengar | G02B 6/02042 385/127 |
| 4,265,515 A * | 5/1981 | Kao | G02B 6/03688 385/124 |
| 4,372,769 A | 2/1983 | Hicks, Jr. | |
| 5,371,826 A * | 12/1994 | Friedman | A61C 1/0046 385/115 |
| 5,374,976 A | 12/1994 | Spannenburg | |
| 5,465,308 A | 11/1995 | Hutcheson et al. | |
| 5,481,385 A | 1/1996 | Zimmerman et al. | |
| 5,519,801 A * | 5/1996 | Le Noane | C03B 37/01222 385/115 |
| 5,553,184 A * | 9/1996 | Eikelmann | G02B 6/04 250/227.2 |
| 5,974,215 A | 10/1999 | Bilbro et al. | |
| 6,041,154 A * | 3/2000 | Ono | G02B 6/06 385/115 |
| 6,384,400 B1 * | 5/2002 | Albagli | G01T 1/2002 250/208.1 |
| 6,487,351 B1 * | 11/2002 | Cryan | C03B 37/028 385/120 |
| 6,611,648 B2 * | 8/2003 | Kumar | C03B 37/01222 385/123 |
| 6,614,972 B1 * | 9/2003 | Lundin | G02B 6/0005 385/121 |
| 6,680,761 B1 | 1/2004 | Greene et al. | |
| 7,016,516 B2 | 3/2006 | Rhoads | |
| 7,054,850 B2 | 5/2006 | Matsugu | |
| 7,235,047 B2 * | 6/2007 | MacAulay | G02B 21/0028 359/201.1 |
| RE39,864 E | 10/2007 | Athale et al. | |
| 7,329,982 B2 | 2/2008 | Conner et al. | |
| 7,773,849 B2 * | 8/2010 | Shani | G02B 6/0028 349/144 |
| 8,369,546 B2 | 2/2013 | Pompei | |
| 8,406,595 B2 * | 3/2013 | Hayashi | G02B 6/02042 385/123 |
| 8,477,906 B2 * | 7/2013 | Morse | G01T 1/201 250/370.09 |
| 8,619,177 B2 | 12/2013 | Perwass et al. | |
| 8,736,675 B1 | 5/2014 | Holzbach et al. | |
| 8,743,466 B2 | 6/2014 | Yamamoto | |
| 8,879,766 B1 | 11/2014 | Zhang | |
| 9,188,737 B2 * | 11/2015 | Joseph | G02B 6/06 |
| 9,411,511 B1 | 8/2016 | Sivertsen | |
| 9,494,738 B1 * | 11/2016 | Farmer | G02B 6/1228 |
| 9,612,395 B2 * | 4/2017 | Karbasivalashani | G02B 6/02338 |
| 9,835,812 B2 * | 12/2017 | Yadlowsky | G02B 6/06 |
| 9,945,985 B2 * | 4/2018 | Morasse | G02B 6/02061 |
| 10,009,597 B2 * | 6/2018 | Karafin | H04N 13/204 |
| 10,052,831 B2 * | 8/2018 | Welker | G02B 6/10 |
| 10,094,974 B2 * | 10/2018 | Chen | G02B 6/02042 |

(56) References Cited

U.S. PATENT DOCUMENTS

| | | | |
|---|---|---|---|
| 10,132,993 B2* | 11/2018 | Buczynski | C03B 37/01211 |
| 10,488,584 B2* | 11/2019 | Karafin | G02B 6/023 |
| 10,551,628 B2 | 2/2020 | Karafin et al. | |
| 10,860,142 B1* | 12/2020 | Northcott | G02B 6/04 |
| 10,884,142 B2* | 1/2021 | Welker | G02B 6/02033 |
| 10,884,251 B2 | 1/2021 | Karafin et al. | |
| 2002/0009261 A1 | 1/2002 | Bhagavatula et al. | |
| 2002/0021501 A1* | 2/2002 | Kawashima | B29D 11/00663 |
| | | | 359/742 |
| 2002/0172478 A1* | 11/2002 | Sahlin | G02B 6/04 |
| | | | 385/115 |
| 2003/0026567 A1* | 2/2003 | Cryan | B29D 11/00682 |
| | | | 385/124 |
| 2003/0030912 A1 | 2/2003 | Gleckman et al. | |
| 2004/0135100 A1 | 7/2004 | Menon et al. | |
| 2004/0108806 A1 | 10/2004 | Cok et al. | |
| 2005/0119575 A1 | 6/2005 | Ladabaum et al. | |
| 2006/0146428 A1* | 7/2006 | Lim | G02B 6/08 |
| | | | 359/833 |
| 2006/0165358 A1* | 7/2006 | Trebst | G02B 6/04 |
| | | | 385/115 |
| 2006/0191566 A1 | 8/2006 | Schaffsma | |
| 2006/0256415 A1 | 11/2006 | Holmes et al. | |
| 2007/0091638 A1 | 4/2007 | Ijzerman et al. | |
| 2007/0097108 A1* | 5/2007 | Brewer | G06F 1/1615 |
| | | | 345/204 |
| 2007/0238296 A1 | 10/2007 | Shimizu | |
| 2008/0023137 A1 | 1/2008 | Jiang et al. | |
| 2008/0035834 A1 | 2/2008 | Gleckler | |
| 2008/0144174 A1 | 6/2008 | Lucente et al. | |
| 2008/0192313 A1 | 8/2008 | Matsumura et al. | |
| 2008/0285125 A1* | 11/2008 | Lee | G02B 6/08 |
| | | | 359/449 |
| 2009/0085831 A1* | 4/2009 | Odoi | G02F 1/133524 |
| | | | 345/1.3 |
| 2009/0148098 A1 | 6/2009 | Lewis et al. | |
| 2009/0164397 A1* | 6/2009 | Kwok | G06N 3/004 |
| | | | 706/21 |
| 2009/0235750 A1 | 9/2009 | Chang | |
| 2009/0247305 A1 | 10/2009 | Kanekal | |
| 2009/0266992 A1 | 10/2009 | Beekman | |
| 2009/0273538 A1* | 11/2009 | Smith | H01Q 15/02 |
| | | | 343/909 |
| 2009/0273575 A1 | 11/2009 | Pryor | |
| 2010/0245824 A1 | 9/2010 | Schwarz | |
| 2010/0265457 A1 | 10/2010 | Chomyn et al. | |
| 2010/0278480 A1 | 11/2010 | Vasylyev | |
| 2011/0094269 A1* | 4/2011 | Mukasa | C03B 37/01214 |
| | | | 65/435 |
| 2011/0114831 A1 | 5/2011 | Grier | |
| 2011/0169832 A1* | 7/2011 | Brown | G06F 3/0304 |
| | | | 345/427 |
| 2012/0050562 A1 | 3/2012 | Perwass et al. | |
| 2012/0206390 A1 | 8/2012 | Ueno et al. | |
| 2012/0206726 A1 | 8/2012 | Pervez et al. | |
| 2012/0268950 A1 | 10/2012 | Parkyn et al. | |
| 2012/0300044 A1 | 11/2012 | Thomas et al. | |
| 2013/0088785 A1 | 4/2013 | Yamamoto | |
| 2013/0127832 A1 | 5/2013 | Lee | |
| 2013/0140916 A1 | 6/2013 | Dunlap et al. | |
| 2013/0163089 A1 | 6/2013 | Bohn | |
| 2013/0195410 A1 | 8/2013 | Karbasivalashani et al. | |
| 2013/0265485 A1 | 10/2013 | Kang | |
| 2014/0035959 A1 | 2/2014 | Lapstun | |
| 2014/0043370 A1 | 2/2014 | Payne et al. | |
| 2014/0072141 A1 | 3/2014 | Cohen | |
| 2014/0126322 A1 | 5/2014 | Cipolla et al. | |
| 2014/0132694 A1 | 5/2014 | Shacham et al. | |
| 2014/0192087 A1* | 7/2014 | Frost | G06F 3/011 |
| | | | 345/633 |
| 2014/0253613 A1 | 9/2014 | Gilbert | |
| 2014/0300709 A1 | 10/2014 | Futterer et al. | |
| 2014/0307179 A1 | 10/2014 | Zhao et al. | |
| 2014/0371353 A1 | 12/2014 | Mitchel et al. | |
| 2015/0007025 A1 | 1/2015 | Sassi | |
| 2015/0022754 A1 | 1/2015 | Jepsen | |
| 2015/0185841 A1 | 7/2015 | Levesque | |
| 2015/0192995 A1 | 7/2015 | Subramanian | |
| 2015/0212274 A1* | 7/2015 | Kopp | G02B 6/30 |
| | | | 385/43 |
| 2015/0219940 A1 | 8/2015 | Kim et al. | |
| 2015/0247976 A1 | 9/2015 | Abovitz et al. | |
| 2015/0277378 A1 | 10/2015 | Smithwick | |
| 2016/0004055 A1 | 1/2016 | Delsaut et al. | |
| 2016/0070059 A1 | 3/2016 | Chen et al. | |
| 2016/0175701 A1 | 6/2016 | Fray et al. | |
| 2016/0180511 A1 | 6/2016 | Zhou et al. | |
| 2016/0205394 A1 | 7/2016 | Meng et al. | |
| 2016/0209657 A1 | 7/2016 | Popovich et al. | |
| 2016/0223988 A1 | 8/2016 | Bove | |
| 2016/0282614 A1 | 9/2016 | Zagolla et al. | |
| 2016/0282808 A1 | 9/2016 | Smalley | |
| 2017/0016996 A1* | 1/2017 | Welker | B29D 11/00682 |
| 2018/0128973 A1 | 5/2018 | Powell et al. | |
| 2018/0356591 A1* | 12/2018 | Karafin | H04N 13/344 |
| 2018/0372926 A1* | 12/2018 | Karafin | H04N 13/344 |
| 2018/0372958 A1* | 12/2018 | Karafin | H04N 13/344 |
| 2019/0004228 A1* | 1/2019 | Bevensee | H04N 13/344 |
| 2019/0004319 A1* | 1/2019 | Karafin | H04N 13/344 |
| 2019/0004326 A1* | 1/2019 | Karafin | H04N 13/344 |
| 2019/0011621 A1* | 1/2019 | Karafin | H04N 13/344 |
| 2020/0394791 A1* | 12/2020 | Pang | G06N 3/04 |
| 2021/0063766 A1* | 3/2021 | Karafin | G02B 3/0037 |
| 2021/0253468 A1* | 8/2021 | Wood | C03B 37/01214 |

FOREIGN PATENT DOCUMENTS

| | | | | |
|---|---|---|---|---|
| CN | 102591124 A | | 7/2012 | |
| CN | 103616770 A | | 3/2014 | |
| CN | 103777455 A | | 5/2014 | |
| CN | 105334690 A | | 2/2016 | |
| GB | 474564 A | | 11/1937 | |
| GB | 1399597 A | | 7/1975 | |
| GB | 2253070 A | * | 8/1992 | B29C 55/00 |
| JP | H08179131 A | | 7/1996 | |
| JP | 2000347046 A | | 12/2000 | |
| JP | 2003330109 A | | 11/2003 | |
| JP | 2008052010 A | | 3/2008 | |
| JP | 2008058583 A | | 3/2008 | |
| JP | 2009169142 A | | 7/2009 | |
| JP | 2009169143 A | | 7/2009 | |
| JP | 2011090272 A | | 5/2011 | |
| JP | 2014142368 A | | 8/2014 | |
| JP | 2016518629 A | | 6/2016 | |
| KR | 101298848 B1 | | 8/2013 | |
| TW | 200402012 A | | 2/2004 | |
| TW | 200633258 A | | 9/2006 | |
| WO | WO-0106287 A1 | * | 1/2001 | G02B 6/0006 |
| WO | 2005057670 A2 | | 6/2005 | |
| WO | 2008048360 A2 | | 4/2008 | |
| WO | 2008093721 A1 | | 8/2008 | |
| WO | 2011158752 A1 | | 12/2011 | |
| WO | 2012029081 A1 | | 3/2012 | |
| WO | 2014188149 | | 11/2014 | |
| WO | 2016046514 | | 3/2016 | |

OTHER PUBLICATIONS

International Search Report and Written Opinion of PCT/US17/42452 dated Nov. 17, 2017.
International Search Report and Written Opinion of PCT/US17/42275 dated Dec. 4, 2017.
International Search Report and Written Opinion of PCT/US17/42468 dated Nov. 27, 2017.
International Search Report and Written Opinion of PCT/US17/42470 dated Dec. 28, 2017.
International Search Report and Written Opinion of PCT/US17/42418 dated Dec. 20, 2017.
International Search Report and Written Opinion of PCT/US17/42467 dated Dec. 27, 2017.
International Search Report and Written Opinion of PCT/US2017/042466 dated Nov. 28, 2017.

(56) References Cited

OTHER PUBLICATIONS

International Search Report and Written Opinion of PCT/US2016/23753 dated Jul. 15, 2016.
EP-17828622.5 European Extended Search Report of European Patent Office dated Mar. 6, 2020.
EP-17828632.4 European Partial Search Report of European Patent Office dated Feb. 10, 2020.
EP-17828613.4 European Extended Search Report of European Patent Office dated Mar. 6, 2020.
"Plastics-Vocabulary", International Organization for Standardization, Switzerland 1999, ISO 472 2013.
AU-2017296073 Examination Report No. 1 dated Aug. 15, 2018.
AU-2017296234 Examination Report No. 1 dated Jul. 19, 2018.
AU-2017296234 Examination Report No. 2 dated Sep. 24, 2018.
AU-2017297629 Notice of Acceptance dated Jul. 26, 2018.
AU-2018256628 Examination Report No. 1 dated Jul. 1, 2019.
AU-2019200583 Examination Report No. 1 dated Oct. 17, 2019.
CN201780043946.8 First Office Action of the Chinese Patent Office dated Dec. 22, 2020.
CN201780044006.0 First Office Action of the Chinese Patent Office dated Dec. 16, 2020.
CN201780044008.X First Office Action of the Chinese Patent Office dated Sep. 29, 2020.
EA-201892633 Office Action of the Eurasian Patent Office dated Aug. 10, 2020.
EA-201892637 Office Action of the Eurasian Patent Office dated Mar. 6, 2020.
EP-17828596.1 European Extended Search Report of European Patent Office dated Mar. 23, 2020.
Gerald L., "Size of Letters Required for Visibility as a Function of Viewing Distance and Observer Visual Acuity," U.S. Department of Commerce/National Bureau of Statistics, Jul. 1983.
International Preliminary Report on Patentability of PCT/US2017/042418 dated Mar. 25, 2019.
International Search Report and Written Opinion of PCT/US2019/013310 dated May 13, 2019.
International Search Report and Written Opinion of PCT/US2019/013399 dated Jun. 10, 2019.
International Search Report and Written Opinion of PCT/US2019/013552 dated May 2, 2019.
NZ-743813 First Examination Report dated Sep. 14, 2018.
NZ-743822 Further Examination Report dated Jun. 11, 2019.
Smith, T.E., "Notebook for Spatial Data Analysis, Part I, Spatial Point Pattern Analysis", (2016) ESE 502, (http://www.seas.upenn.edu/~ese502/#notebook).
Wetzstein et al., "On Plenoptic Multiplexing and Reconstruction", International Journal on Computer Vision (IJCV, vol. 101, No. 2, (20130000), pp. 384-400, URL: https://hal.inria.fr/hal-00876493, (Sep. 26, 2017).
JP2019-501554 Non-Final Notice of Reasons for Rejection of the Japan Patent Office dated Jun. 8, 2021.
JP2019-501428 Non-Final Notice of Reasons for Rejection from the Japan Patent Office dated Aug. 3, 2021.
Choi et al., "Multiple-viewing-zone integral imaging using a dynamic barrier array for three-dimensional displays", Optics Express, vol. 11, No. 8, Apr. 21, 2003 (Apr. 21, 2003), p. 927.
EP-19738109.8 European Extended Search Report of European Patent Office dated Oct. 18, 2021.
EP-19738344.1 European Extended Search Report of European Patent Office dated Oct. 7, 2021.
EP-19738383.9 European Extended Search Report of European Patent Office dated Oct. 15, 2021.
JP2019-501531 Non-Final Notice of Reasons for Rejection of the Japan Patent Office dated Sep. 24, 2021.
Lewter, "Adjustable Slab Slump Molds—Electric Cone 6 & Other Ways w/ Clay", Oct. 2, 2017 (Oct. 2, 2017) pp. 1-3.
CN201780043946.8 Second Office Action of the Chinese Patent Office dated Sep. 15, 2021.
Davis et al., "Simulation of Anderson localization in a random fiber using a fast Fresnel diffraction algorithm", Optical Engineering, Soc. of Photo-Optical Instrumentation Engineers, Bellingham, vol. 55, No. 6, Jun. 1, 2016 (Jun. 1, 2016), p. 66122.
EP-17828613.4 European Exam Report of European Patent Office dated Aug. 16, 2021.
Karbasi et al., "Image transport using Anderson localized modes in disordered optical fibers", Proceedings of SPIE, IEEE, US, vol. 8992, Mar. 8, 2014 (Mar. 8, 2014), pp. 89920J-89920J.
Mafi et al., "Anderson localisation in fibres", 2014 The European Conference On Optical Communication (ECOC), Systematic Paris Region Systems and ICT Cluster, Sep. 21, 2014 (Sep. 21, 2014), pp. 1-3.
Mafi, "Transverse Anderson localization of light: a tutorial", Advances in Optics and Photonics, vol. 7, No. 3, Sep. 30, 2015 (Sep. 30, 2015), p. 459.
TW106123878 Office Action of the Taiwan Patent Office dated Nov. 15, 2021.

* cited by examiner

SYSTEM AND METHODS FOR REALIZING TRANSVERSE ANDERSON LOCALIZATION IN ENERGY RELAYS USING COMPONENT ENGINEERED STRUCTURES

TECHNICAL FIELD

This disclosure generally relates to energy relays, and more specifically, to systems of transverse Anderson localization energy relays and methods of manufacturing thereof.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

Disclosed are system and method of manufacturing transverse Anderson localization energy relays with engineered structures.

One method of forming a transverse Anderson localization energy relays with engineered structures includes: (a) providing one or more of a first component engineered structure, the first component engineered structure having a first set of engineered properties, and (b) providing one or more of a second component engineered structure, the second component engineered structure having a second set of engineered properties, where both the first component engineered structure and the second component engineered structure have at least two common engineered properties, denoted by a first engineered property and a second engineered property.

Next step in the method includes (c) forming a medium using the one or more of the first component engineered structure and the one or more of the second component engineered structure, the forming step randomizes the first engineered property in a first plane of the medium resulting in a first variability of that engineered property in that plane, with the values of the second engineered property allowing for a variation of the first engineered property in a second plane of the medium, where the variation of the first engineered property in the second plane is less than the variation of the first engineered property in the first plane.

In one embodiment, the first engineered property that is common to both the first component engineered structure and the second component engineered structure is index of refraction, and the second engineered property that is common to both the first component engineered structure and the second component engineered structure is shape, and the forming step (c) randomizes the refractive index of the first component engineered structure and the refractive index of the second component engineered structure along a first plane of the medium resulting in a first variability in index of refraction, with the combined geometry of the shapes of the first component engineered structure and the second component engineered structure resulting in a variation in index of refraction in the second plane of the medium, where the variation of the index of refraction in the second plane is less than the variation of index of refraction in the first plane of the medium.

In one embodiment, the method further includes (d) forming an assembly using the medium such that the first plane of the medium extends along the transverse orientation of the assembly and the second plane of the medium extends along the longitudinal orientation of the assembly, where energy waves propagating through the assembly have higher transport efficiency in the longitudinal orientation versus the transverse orientation and are spatially localized in the transverse orientation due to the first engineered property and the second engineered property.

In some embodiments, the forming steps (c) or (d) includes forming the assembly into a layered, concentric, cylindrical configuration or a rolled, spiral configuration or other assembly configurations required for optical prescriptions defining the formation of the assembly of the one or more first component engineered structure and the one or more second component engineered structure in predefined volumes along at least one of the transverse orientation and the longitudinal orientation thereby resulting in one or more gradients between the first order of refractive index and the second order of refractive index with respect to location throughout the medium.

In other embodiments, each of the forming steps (c) and (d) includes at least one of forming by intermixing, curing, bonding, UV exposure, fusing, machining, laser cutting, melting, polymerizing, etching, engraving, 3-D printing, CNCing, lithographic processing, metallization, liquefying, deposition, ink-jet printing, laser forming, optical forming, perforating, layering, heating, cooling, ordering, disordering, polishing, Obliterating, cutting, material removing, compressing, pressurizing, vacuuming, gravitational forces and other processing methods.

In yet another embodiment, the method further includes (e) processing the assembly by forming, molding or machining to create at least one of complex or formed shapes, curved or slanted surfaces, optical elements, gradient index lenses, diffractive optics, optical relay, optical taper and other geometric configurations or optical devices.

In an embodiment, the properties of the engineered structures of steps (a) and (b) and the formed medium of step (c) cumulatively combine to exhibit the properties of Transverse Anderson Localization.

In some embodiments, the forming step (c) includes forming with at least one of: (i) an additive process of the first component engineered structure to the second component engineered structure; (ii) a subtractive process of the first component engineered structure to produce voids or an inverse structure to form with the second component engineered structure; (iii) an additive process of the second component engineered structure to the first component engineered structure; or (iv) a subtractive process of the second component engineered structure to produce voids or an inverse structure to form with the first component engineered structure.

In one embodiment, each of the providing steps (a) and (b) includes the one or more of the first component engineered structure and the one or more of the second component engineered structure being in at least one of liquid, gas or solid form. In another embodiment, each of the providing steps (a) and (b) includes the one or more of the first component engineered structure and the one or more of the second component engineered structure being of at least one of polymeric material, and where each of the first refractive index and the second refractive index being greater than 1. In one embodiment, each of the providing steps (a) and (b) includes the one or more of the first component engineered structure and the one or more of the second component engineered structure, having one or more of first component engineered structure dimensions differing in a first and second plane, and one or more of second component engineered structure dimensions differing in a first and second plane, where one or more of the structure dimensions of the second plane are different than the first plane, and the structure dimension of the first plane are less than four times the wavelength of visible light.

Another method of forming a transverse Anderson localization energy relays with engineered structures includes: (a) providing one or more of a first component engineered structure, the first component engineered structure having a first refractive index $n_0$, engineered property $p_0$, and first absorptive optical quality $b_0$, and (b) providing one or more N component engineered structure, each $N_i$ structure with refractive index engineered property $p_i$, and absorptive optical quality $b_i$, where N is 1 or greater.

In another embodiment, the method includes: (c) forming a medium using the one or more of the first component engineered structure, and the one or more of the $N_i$ structure, the forming step randomizes the first refractive index $n_0$ and the refractive index $n_i$ along a first plane of the medium resulting in a first refractive index variability, with engineered properties $p_0$ and $p_i$ inducing a second refractive index variability along a second plane of the medium, where the second plane is different from the first plane, and where the second refractive index variability is lower than the first refractive index variability due to the combined geometry between the first engineered property $p_0$ and the engineered property $p_i$.

In yet another embodiment, the method includes: (d) forming an assembly using the medium such that the first plane of the medium is the transverse orientation of the assembly and the second plane of the medium is the longitudinal orientation of the assembly, where energy waves propagating from an entrance to an exit of the assembly have higher transport efficiency in the longitudinal orientation versus the transverse orientation and are spatially localized in the transverse orientation due to the engineered properties and the resultant refractive index variability, and where the absorptive optical quality of the medium facilitates the reduction of unwanted diffusion or scatter of energy waves through the assembly.

In some embodiments, where each of the providing steps (a) and (b) includes the one or more of the first component engineered structure and the one or more of the i structure being an additive process including at least one of bonding agent, oil, epoxy, and other optical grade, adhesive materials or immersion fluids.

In some embodiments, the forming step (c) includes forming the medium into a non-solid form, and where the forming step (d) includes forming the assembly into a loose, coherent waveguide system having a flexible housing for receiving the non-solid form medium.

In other embodiments, the forming step (c) includes forming the medium into a liquid form, and where the forming step (d) includes forming the assembly by directly depositing or applying liquid form medium.

In some embodiments, the forming steps (c) and (include combining two or more loose or fused mediums in varied orientations for forming at least one of multiple entries or multiple exits of the assembly.

In other embodiments, the forming step (d) includes forming the assembly into a system to transmit and receive the energy waves. In one embodiment, the system is capable of both transmitting and receiving localized energy simultaneously through the same medium.

Another method of forming a transverse Anderson localization energy relays with engineered structures includes: (a) providing one or more component engineered structure, each one or more structure having material engineered properties, where at least one structure is processed into a transient bi-axial state or exhibits non-standard temporary ordering of chemical chains; (b) forming a medium by at least one of an additive, subtractive or isolated process, the additive process includes adding at least one transient structure to one or more additional structure, the subtractive process includes producing voids or an inverse structure from at least one transient structure to form with the one or more additional structure, the isolated process includes engineering at least one transient structure in the absence or removal of additional structure; and (c) forming an assembly with the medium such that at least one transient material modifies the transient ordering of chemical chains inducing an increase of material property variation along a first plane of an assembly relative to a decrease of material property variation along a second plane of an assembly.

In one embodiment, the method further includes: (d) the formed assembly of step (c) resulting in structures within the compound formed medium of step (b) exhibiting at least one of different dimensions, particle size or volume individually and cumulatively as provided for in step (a) and engineered as a compound sub-structure for further assembly; (e) providing at least one or more of the compound sub-structure from step (c) and the compound formed medium from step (b), collectively called sub-structure, the one or more sub-structure having one or more refractive index variation for a first and second plane and one or more sub-structure engineered property; (f) providing one or more N structure, each $N_i$ structure having a refractive index $n_i$ and an engineered property $p_i$, where i is 1 or greater; (g) forming a medium using the one or more sub-structure and the one or more $N_i$ structure, the forming step randomizes the $n_i$ refractive index along the one or more sub-structure's first plane resulting in a first compound medium refractive index variability, with engineered properties inducing a second compound medium refractive index variability along the one or more sub-structure's second plane, where the one or more sub-structure's second plane is different from the one or more sub-structure's first plane, and where the second compound medium refractive index variability is lower than the first compound medium refractive index variability due to the one or more sub-structure engineered property and the $N_i$ engineered property; and (h) forming a compound assembly using the compound medium such that the one or more sub-structure's first plane is the transverse orientation of the compound assembly and the one or more sub-structure's second plane is the longitudinal orientation of the compound assembly, where energy waves propagating to or from an entrance to an exit of the compound assembly have higher transport efficiency in the longitudinal orientation versus the transverse orientation and are spatially localized in the transverse orientation due to the compound engineered properties and the resultant compound refractive index variability.

In some embodiments, the assembly of step (c) step (h) includes heating or other form of processing to modify the transient ordering of chemical chains of the materials within the assembly, where the arrangement, density, and engineered property of the transient materials are varied in at least one of the transverse orientation or the longitudinal orientation, thereby causing the assembly during heat treatment or other processing to naturally taper or cause dimensional variations along at least one of the transverse orientation or the longitudinal orientation of the assembly to produce various optical geometries that would have otherwise required complex manufacturing that maintain the appropriate ordering for energy transport efficiency.

In one embodiment, a device having Transverse Anderson Localization property includes a relay element formed of one or more of a first structure and one or more of a second structure, the first structure having a first wave propagation property and the second structure having a second wave propagation property, the relay element configured to relay energy therethrough, where, along a transverse orientation the first structure and the second structure are arranged in an interleaving configuration with spatial variability, where, along a longitudinal orientation the first structure and the second structure have substantially similar configuration, and where energy is spatially localized in the transverse orientation and greater than about 50% of the energy propagates along the longitudinal orientation versus the transverse orientation through the relay element.

In another embodiment, the relay element includes a first surface and a second surface, and wherein the energy propagating between the first surface and the second surface travel along a path that is substantially parallel to the longitudinal orientation. In some embodiments, the first wave propagation property is a first index of refraction and the second wave propagation property is a second index of refraction, where a variability between the first index of refraction and the second index of refraction results in the energy being spatially localized in the transverse orientation and greater than about 50% of the energy propagating from the first surface to the second surface.

In one embodiment, the energy passing through the first surface has a first resolution, where the energy passing through the second surface has a second resolution, and where the second resolution is no less than about 50% of the first resolution. In another embodiment, the energy with a uniform profile presented to the first surface passes through the second surface to substantially fill a cone with an opening angle of +/−10 degrees relative to the normal to the second surface, irrespective of location of the energy on the second surface.

In one embodiment, the first surface has a different surface area than the second surface, where the relay element further comprises a sloped profile portion between the first surface and the second surface, and where the energy passing through the relay element results in spatial magnification or spatial de-magnification. In another embodiment, each of the first structure and the second structure includes glass, carbon, optical fiber, optical film, polymer or mixtures thereof.

In some embodiments, both the first surface and the second surface are planar, or both the first surface and the second surface are non-planar, or the first surface is planar and the second surface is non-planar, or the first surface is non-planar and the second surface is planar, or bath the first surface and the second surface are concave, or both the first surface and the second surface are convex, or the first surface is concave and the second surface is convex, or the first surface is convex and the second surface is concave.

In one embodiment, the device includes the first structure having an average first dimension along the transverse orientation that is less than four times the wavelength of the energy relayed therethrough, average second and third dimensions substantially larger than the average first dimension along second and third orientations, respectively, the second and third orientations substantially orthogonal to the transverse orientation, where the second wave propagation property has the same property as the first wave propagation property but with a different value, where the first structure and the second structure are arranged with maximum spatial variability in the transverse dimension such that the first wave propagation property and the second wave propagation property have maximum variation, where the first structure and the second structure are spatially arranged such that the first wave propagation property and the second wave propagation property are invariant along the longitudinal orientation, and where along the transverse orientation throughout the relay element, the center-to-center spacing between channels of the first structure varies randomly, with an average spacing between one and four times an average dimension of the first structure, and where two adjacent longitudinal channels of the first structure are separated by the second structure at substantially every location by a distance of at least one half the average dimension of the first structure.

In one embodiment, the relay element includes a first surface and a second surface, and where the energy propagating between the first surface and the second surface travel along a path that is substantially parallel to the longitudinal orientation. In another embodiment, the first wave propagation property is a first index of refraction and the second wave propagation property is a second index of refraction, where a variability between the first index of refraction and the second index of refraction results in the energy being spatially localized in the transverse orientation and greater than about 50% of the energy propagating from the first surface to the second surface.

In one embodiment, a system may include Transverse Anderson Localization energy relays with engineered structures incorporating the devices and relay elements described herein.

These and other advantages of the present disclosure will become apparent to those skilled in the art from the following detailed description and the appended claims.

DETAILED DESCRIPTION

Figure 1:
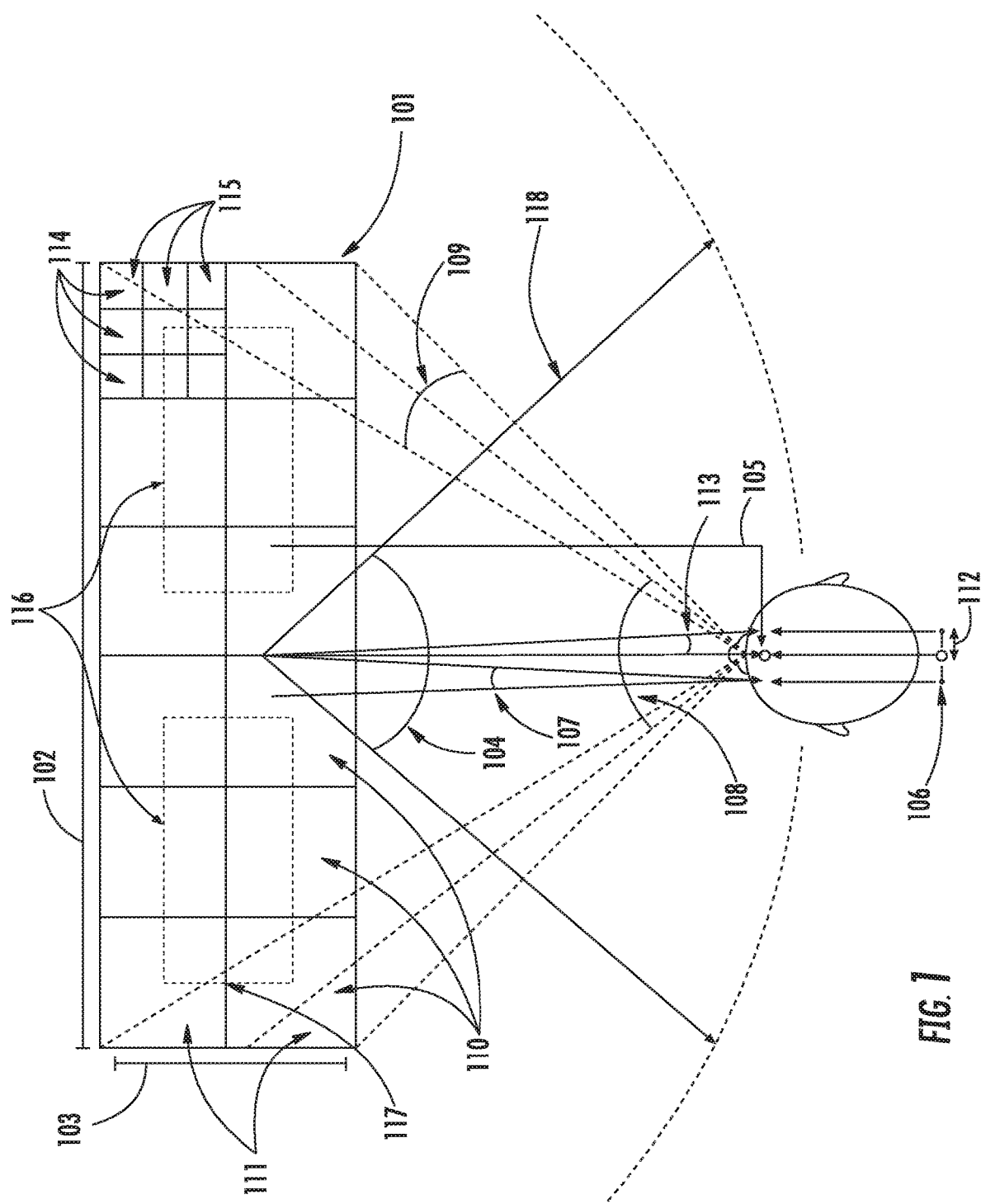
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of electromagnetic and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory system at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bi-directional energy surface architecture, all components may be configured to form the appropriate structures for any energy domain to enable holographic propagation.

However, the main challenge to enable the Holodeck today involves available visual technologies and electromagnetic device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there in some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult inter-ocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/−60 degrees about the center of the display), desired intermediate samples at a distance (e.g., one additional propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\text{Surface Aspect Ratio} = \frac{\text{Width }(W)}{\text{Height }(H)}$$

$$\text{Surface Horizontal Size} = \text{Surface Diagonal} * \left(\frac{1}{\sqrt{1+\left(\frac{H}{W}\right)^2}}\right)$$

$$\text{Surface Veritial Size} = \text{Surface Diagonal} * \left(\frac{1}{\sqrt{1+\left(\frac{W}{H}\right)^2}}\right)$$

$$\text{Horizontal Field of View} = 2 * atan\left(\frac{\text{Surface Horizontal Size}}{2*\text{Seating Distance}}\right)$$

$$\text{Vertical Field of View} = 2 * atan\left(\frac{\text{Surface Veritcal Size}}{2*\text{Seating Distance}}\right)$$

$$\text{Horizontal Element Resolution} = \text{Horizontal } FoV * \frac{60}{\text{Eye Resolution}}$$

$$\text{Verical Element Resolution} = \text{Vertical } FoV * \frac{60}{\text{Eye Resolution}}$$

The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\text{Sample Distance} = \frac{\text{Inter-Ocular Distance}}{(\text{Number of Desired Intermediate Samples} + 1)}$$

$$\text{Angluar Sampling} = atan\left(\frac{\text{Sample Distance}}{\text{Seating Distance}}\right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

$$\text{Locations Per Element}(N) = \frac{\text{Seating } FoV}{\text{Angular Sampling}}$$

$$\text{Total Resolution } H = N * \text{Horizontal Element Resolution}$$

$$\text{Total Resolution } V = N * \text{Vertical Element Resolution}$$

With the above scenario given the size of energy surface and the angular resolution addressed for the visual acuity system, the resultant energy surface may desirably include approximately 400k×225k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
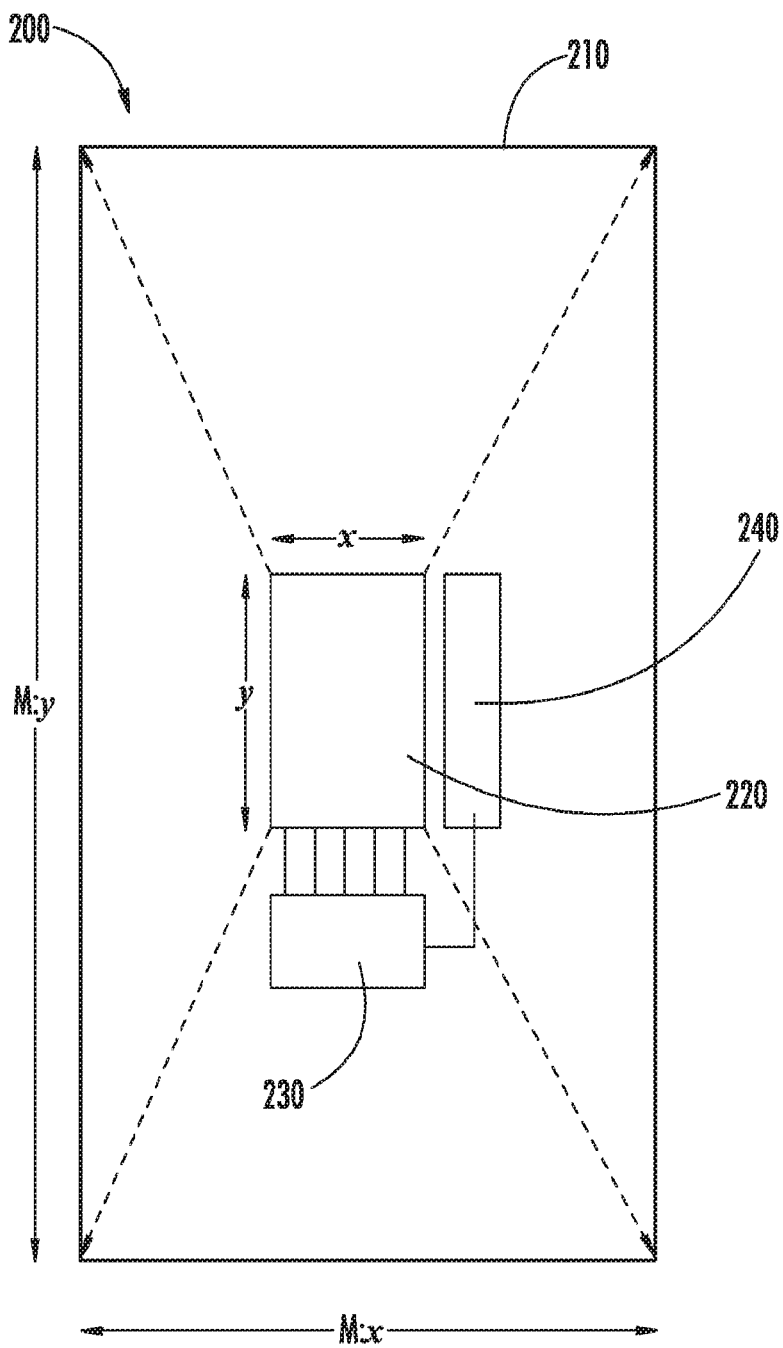
FIG. 2 is a schematic diagram illustrating an energy system having an active device area with a mechanical envelope.

FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface, given:

$$\text{Devices } H = \frac{\text{Total Resolution } H}{\text{Device Resolution } H}$$

$$\text{Devices } V = \frac{\text{Total Resolution } V}{\text{Device Resolution } V}$$

Given the above resolution considerations, approximately 105×105 devices similar to those shown in FIG. 2 may be desired. It should be noted that many devices consist of various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase the effective size of the active device area to meet or exceed the mechanical dimensions to configure an array of relays and form a singular seamless energy surface.

Figure 3:
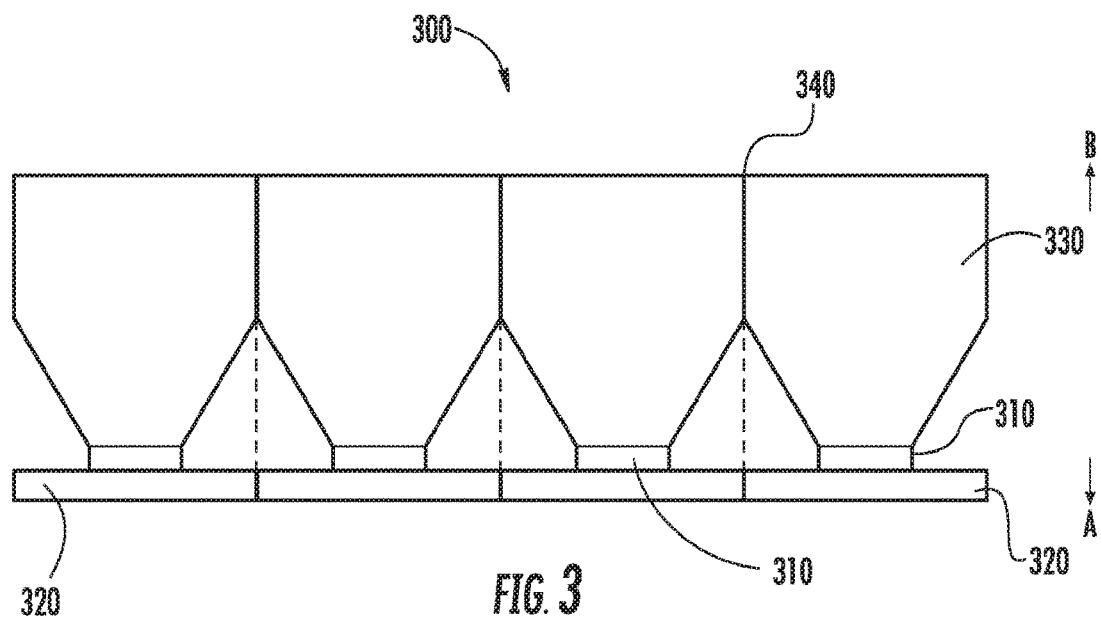
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figure 4:
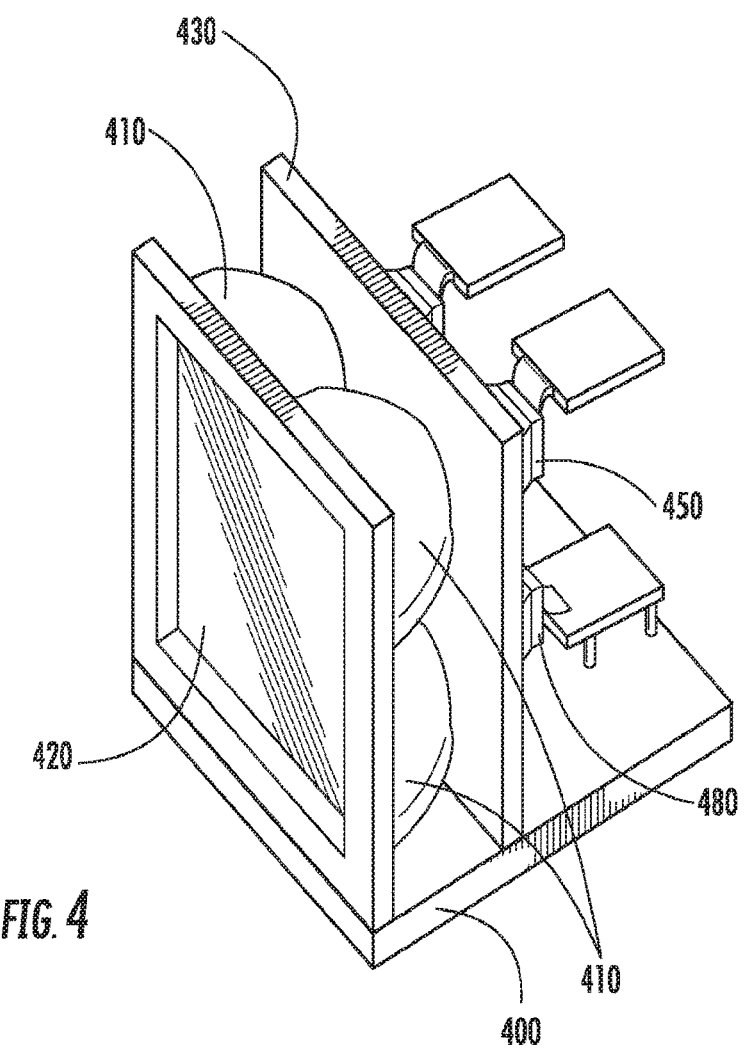
FIG. 4 is a schematic diagram illustrating an embodiment of energy relay elements adhered together and fastened to a base structure.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless display surface directing energy along propagation paths extending between one or more energy locations and the seamless display surface, and where the separation between the edges of any two adjacent second sides of the terminal energy relay elements is less than the minimum perceptible contour as defined by the visual acuity of a human eye having better than 20/40 vision at a distance greater than the width of the singular seamless display surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10-degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bi-directional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

Figure 5A:
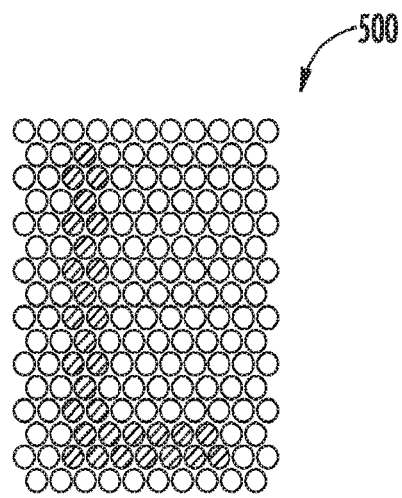
FIG. 5A is a schematic diagram illustrating an example of a relayed image through multi-core optical fibers.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 3.

Figure 5B:
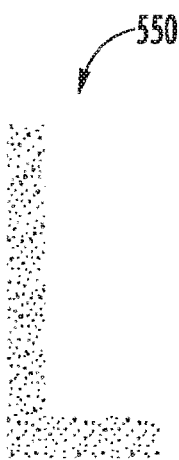
FIG. 5B is a schematic diagram illustrating an example of a relayed image through an optical relay that exhibits the properties of the Transverse Anderson Localization principle.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

There is significant advantage to the Transverse Anderson Localization material properties in terms of both cost and weight, where a similar optical grade glass material, may cost and weigh upwards of 10 to 100-fold more than the cost for the same material generated within an embodiment, wherein disclosed systems and methods comprise randomized microscopic component engineered structures demonstrating significant opportunities to improve both cost and quality over other technologies known in the art.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein energy waves propagating through the energy relay have higher transport efficiency in the longitudinal orientation versus the transverse orientation and are spatially localized in the transverse orientation.

In an embodiment, multiple energy domains may be configured within a single, or between multiple Transverse Anderson Localization energy relays to direct one or more sensory holographic energy propagation paths including visual, acoustic, tactile or other energy domains.

In an embodiment, the seamless energy surface is configured with Transverse Anderson Localization energy relays that comprise two or more first sides for each second side to both receive and emit one or more energy domains simultaneously to provide bi-directional energy propagation throughout the system.

In an embodiment, the Transverse Anderson Localization energy relays are configured as loose coherent or flexible energy relay elements.

Considerations for 4D Plenoptic Functions

Selective Propagation of Energy Through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plenoptic function with a structure configured to alter an angular direction of the energy waves passing through representing the angular component of the 4D plenoptic function, wherein the energy waves propagated may converge in space in accordance with a plurality of propagation paths directed by the 4D plenoptic function.

Figure 6:
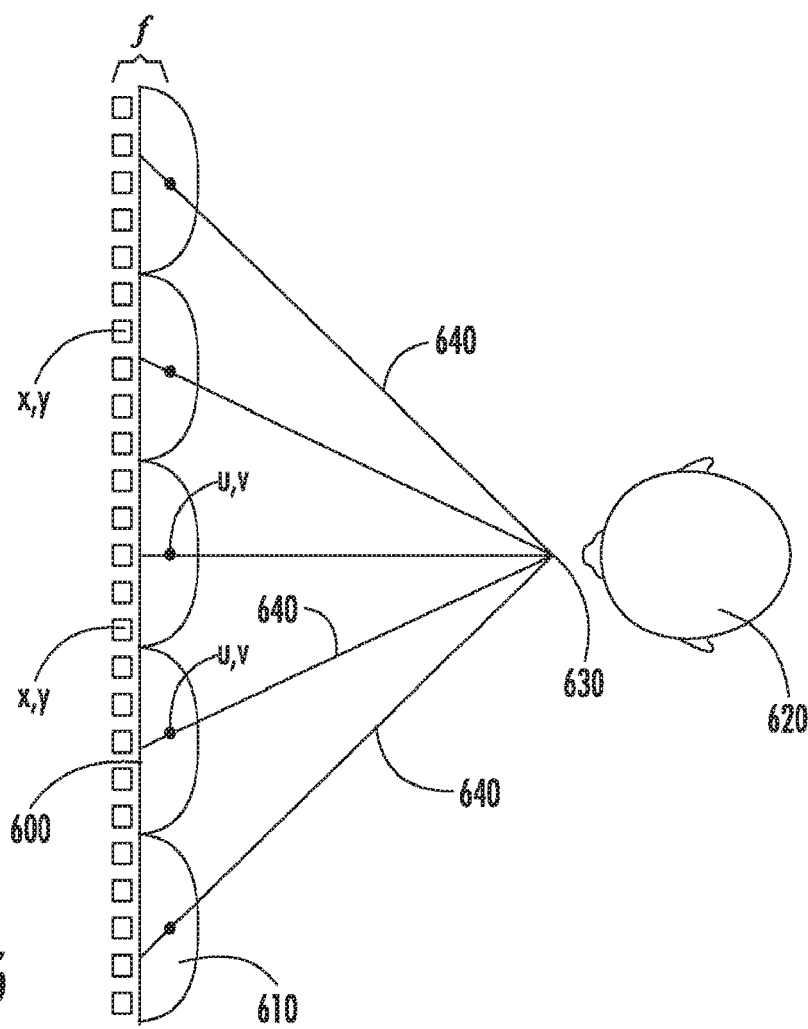
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general, and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due designs that have not accurately accounted for any of diffraction, scatter, diffusion, angular direction, calibration, focus, collimation, curvature, uniformity, element crosstalk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bi-directional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Bi-Directional Seamless Energy Surface Systems to Stimulate Human Sensory Receptors within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bi-directional holographic energy propagation, emission, reflection, or sensing.

In an embodiment, an environment of tiled seamless energy systems are aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregates tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bi-directionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bi-directional energy propagation and aggregated surfaces are possible.

In an embodiment, the system comprises an energy waveguide capable of bi-directional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bi-directional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bi-directional captured data and projection information.

In some embodiments, a plurality of combinations of three energy devices comprising an ultrasonic sensor, a visible electromagnetic display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and electromagnetic energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration tiles.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bi-directional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

System and Methods for Production of Transverse Anderson Localization Energy Relays While the Anderson localization principle was introduced in the 1950s, it wasn't until recent technological breakthroughs in materials and processes that allowed the principle to be explored practically in optical transport. Transverse Anderson localization is the propagation of a wave transported through a transversely disordered but longitudinally invariant material without diffusion of the wave in the transverse plane.

Within the prior art, Transverse Anderson localization has been observed through experimentation in which a fiber optic face plate is fabricated through drawing millions of individual strands of fiber with different refractive index (RI) that were mixed randomly and fused together. When an input beam is scanned across one of the surfaces of the face plate, the output beam on the opposite surface follows the transverse position of the input beam. Since Anderson localization exhibits in disordered mediums an absence of diffusion of waves, some of the fundamental physics are different when compared to ordered optical fiber relays. This implies that the effect of the optical fibers that produce the Anderson localization phenomena are less impacted by total internal reflection than by the randomization of between multiple-scattering paths where wave interference can completely limit the propagation in the transverse orientation while continuing in the longitudinal path.

In an embodiment, it may be possible for Transverse Anderson Localization materials to transport light as well as, or better than, the highest quality commercially available multimode glass image fibers with a higher MTF. With multimode and multicore optical fibers, the relayed images are intrinsically pixelated due to the properties of total internal reflection of the discrete array of cores where any cross-talk between cores will reduce MTF and increase blurring. The resulting imagery produced with multicore optical fiber tends to have a residual fixed noise fiber pattern, as illustrated in FIG. 5A. By contrast, FIG. 5B illustrates the same relayed image through an example material sample that exhibits the properties of the Transverse Anderson Localization principle where the noise pattern appears much more like a grain structure than a fixed fiber pattern.

Another advantage to optical relays that exhibit the Anderson localization phenomena is that it they can be fabricated from a polymer material, resulting in reduced cost and weight. A similar optical grade material, generally made of glass or other similar materials, may cost ten to a hundred (or more) times more than the cost of the same dimension of material generated with polymers further, the weight of the polymer relay optics can be 10-100× less given that up to a majority of the density of the material is air and other light weight plastics. For the avoidance of doubt, any material that exhibits the Anderson localization property may be included in this disclosure herein, even if it does not meet the above cost and weight suggestions. As one skilled in the art will understand that the above suggestion is a single embodiment that lends itself to significant commercial viabilities that similar glass products exclude. Of additional benefit is that for Transverse Anderson Localization to work, optical fiber cladding may not be needed, which for traditional multicore fiber optics is required to prevent the scatter of light between fibers, but simultaneously blocks a portion of the rays of light and thus reduces transmission by at least the core to clad ratio (e.g. a core to clad ratio of 70:30 will transmit at best 70% of received illumination).

Another benefit is the ability to produce many smaller parts that can be bonded or fused without seams as the material fundamentally has no edges in the traditional sense and the merger of any two pieces is nearly the same as generating the component as a singular piece depending on the process to merge the two or more pieces together. For large scale applications, this is a significant benefit for the ability to manufacturer without massive infrastructure or tooling costs, and it provides the ability to generate single pieces of material that would otherwise be impossible with other methods. Traditional plastic optical fibers have some of these benefits but due to the cladding, generally still involve a seam line of some distances.

The present disclosure includes methods of manufacturing materials exhibiting the Transverse Anderson Localization phenomena. A process is proposed to construct relays of electromagnetic energy, acoustic energy, or other types of energy using building blocks that consist of one or more component engineered structures (CES). The term CES refers to a building block component with specific engineered properties (EP) that include, but are not limited to, material type, size, shape, refractive index, center-of-mass, charge, weight, absorption, magnetic moment, among other properties. The size scale of the CES may be on the order of wavelength of the energy wave being relayed, and can vary across the milli-scale, the micro-scale, or the nano-scale. The other EP's are also highly dependent on the wavelength of the energy wave.

Transverse Anderson Localization is a general wave phenomenon that applies to the transport of electromagnetic waves, acoustic waves, quantum waves, energy waves, among others. The one or more building block structures required to form an energy wave relay that exhibits Transverse Anderson Localization each have a size that is on the order of the corresponding wavelength. Another critical parameter for the building blocks is the speed of the energy wave in the materials used for those building blocks, which includes refractive index for electromagnetic waves, and acoustic impedance for acoustic waves. For example, the building block sizes and refractive indices can vary to accommodate any frequency in the electromagnetic spectrum, from X-rays to radio waves.

For this reason, discussions in this disclosure about optical relays can be generalized to not only the full electromagnetic spectrum, but to acoustical energy and other types of energy. For this reason, the use of the terms energy source, energy surface, and energy relay will be used often, even if the discussion is focused on one particular form of energy such as the visible electromagnetic spectrum.

For the avoidance of doubt, the material quantities, process, types, refractive index, and the like are merely exemplary and any optical material that exhibits the Anderson localization property is included herein. Further, any use of disordered materials and processes is included herein.

It should be noted that the principles of optical design noted in this disclosure apply generally to all forms of energy relays, and the design implementations chosen for specific products, markets, form factors, mounting, etc. may or may not need to address these geometries but for the purposes of simplicity, any approach disclosed is inclusive of all potential energy relay materials.

In one embodiment, for the relay of visible electromagnetic energy, the size of the CES should be on the order of 1 micron. The materials used for the CES can be any optical material that exhibits the optical qualities desired to include, but not limited to, glass, plastic, resin and the like. The index of refraction of the materials are higher than 1, and if two CES types are chosen, the difference in refractive index becomes a key design parameter. The aspect ratio of the material may be chosen to be elongated, in order to assist wave propagation in a longitudinal direction.

The formation of a CES may be completed as a destructive process that takes formed materials and cuts the pieces into a desired shaped formation or any other method known in the art, or additive, where the CES may be grown, printed, formed, melted, or produced in any other method known in the art. Additive and destructive processes may be combined for further control over fabrication. These pieces are now constructed to a specified structure size and shape.

In one embodiment, for electromagnetic energy relays, it may be possible to use optical grade bonding agents, epoxies, or other known optical materials that may start as a liquid and form an optical grade solid structure through various means including but not limited to UV, heat, time, among other processing parameters. In another embodiment, the bonding agent is not cured or is made of index matching oils for flexible applications. Bonding agent may be applied to solid structures and non-curing oils or optical liquids. These materials may exhibit certain refractive index (RI) properties. The bonding agent needs to match the RI of either CES material type 1 or CES material type 2. In one embodiment, the RI of this optical bonding agent is 1.59, the same as PS. In a second embodiment, the RI of this optical bonding agent is 1.49, the same as PMMA.

In one embodiment, for energy waves, the bonding agent may be mixed into a blend of CES material type 1 and CES material type 2 in order to effectively cancel out the RI of the material that the bonding agent RI matches. For exemplary purposes only, if CES types PS and PMMA are used, and PS matches the RI of the bonding agent, the result is that PS now acts as a spacer to ensure randomness between PMMA and the bonding agent. Without the presence of the PS, it may be possible that there will not be sufficient randomization between PMMA and the RI of bonding agent. The bonding agent may be thoroughly intermixed such that no regions are unsaturated which may require a certain amount of time for saturation and desired viscous properties. Additional constant agitation may be implemented to ensure the appropriate mixture of the materials to counteract any separation that may occur due to various densities of materials or other material properties.

It may be required to perform this process in a vacuum or in a chamber to evacuate any air bubbles that may form. An additional methodology may be to introduce vibration during the curing process.

An alternate method provides for three or more CES with additional form characteristics and EPs.

In one embodiment, for electromagnetic energy relays, an additional method provides for only a single CES to be used with only the bonding agent, where the RI of the CES and the bonding agent differ, and sufficient intermixing occurs between the single CES and the bonding agent.

An additional method provides for any number of CESs and includes the intentional introduction of air bubbles.

In one embodiment, for electromagnetic energy relays, a method provides for multiple bonding agents with independent desired RIs, and a process to intermix the zero, one, or more CES's as they cure either separately or together to allow for the formation of a completely intermixed structure. Two or more separate curing methodologies may be leveraged to allow for the ability to cure and intermix at different intervals with different tooling and procedural methodologies. In one embodiment, a UV cure epoxy with a RI of 9 intermixed with a heat cure second epoxy with a RI of 1.59 where constant agitation of the materials is provisioned with alternating heat and UV treatments with only sufficient duration to begin to see the formation of solid structures from within the larger mixture, but not long enough for any large particles to form, until such time that no agitation can be continued once the curing process has nearly completed, whereupon the curing processes are implemented simultaneously to completely bond the materials together. In a second embodiment. CES with a RI of 1.49 are added. In a third embodiment, CES with both a RI of 1.49 and 1.59 both added.

In another embodiment, for electromagnetic energy relays, glass and plastic materials are intermixed based upon their respective RI properties.

In an additional embodiment, the cured mixture is formed in a mold and after curing is cut and polished. In another embodiment, the materials leveraged will re-liquefy with heat and are cured in a first shape and then pulled into a second shape to include, but not limited to, tapers or bends.

Figure 7A:
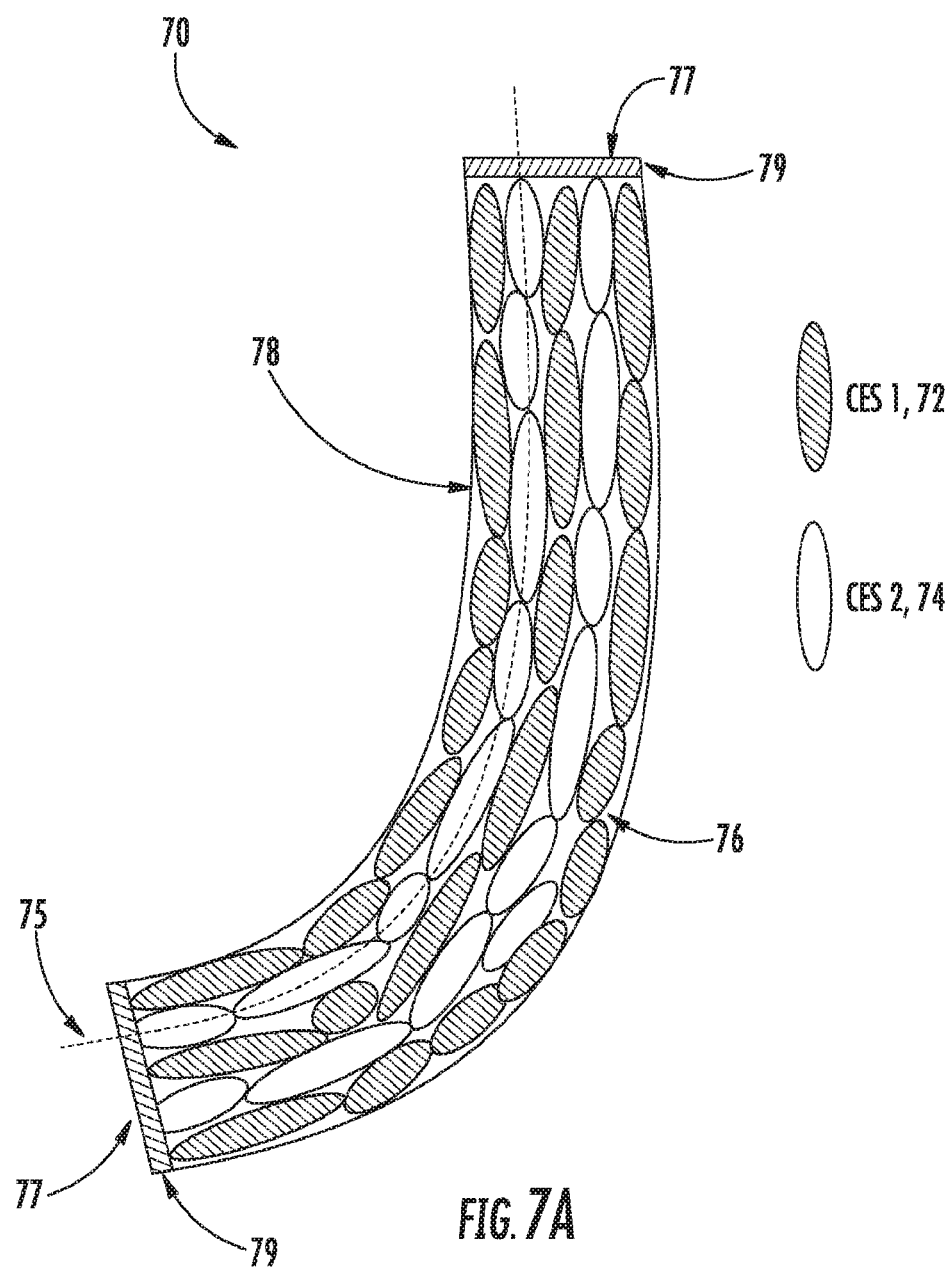
FIG. 7A illustrates a cutaway view of a flexible energy relay which achieves Transverse Anderson Localization by intermixing two component materials within an oil or liquid, in accordance with one embodiment of the present disclosure.

FIG. 7A illustrates a cutaway view of a flexible implementation 70 of a relay exhibiting the Transverse Anderson Localization approach using CES material type 1 (72) and CES material type 2 (74) with intermixing oil or liquid 76 and with the possible use of end cap relays 79 to relay the energy waves from a first surface 77 to a second surface 77 on either end of the relay within a flexible tubing enclosure 78 in accordance with one embodiment of the present disclosure. The CES material type 1 (72) and CES material type 2 (74) both have the engineered property of being elongated—in this embodiment, the shape is elliptical, but any other elongated or engineered shape such as cylindrical or stranded is also possible. The elongated shape allows for channels of minimum engineered property variation 75.

For an embodiment for visible electromagnetic energy relays, implementation 70 may have the bonding agent replaced with a refractive index matching oil 76 with a refractive index that matches CES material type 2 (74) and placed into the flexible tubing enclosure 78 to maintain flexibility of the mixture of CES material type 1 and CES material 2, and the end caps 79 would be solid optical relays to ensure that an image can be relayed from one surface of an end cap to the other. The elongated shape of the CES materials allows channels of minimum refractive index variation 75.

Multiple instances of 70 can be interlaced into a single surface in order to form a relay combiner in solid or flexible form.

In one embodiment, for visible electromagnetic energy relays, several instances of 70 may each be connected on one end to a display device showing only one of many specific tiles of an image, with the other end of the optical relay placed in a regular mosaic, arranged in such a way to display the full image with no noticeable seams. Due to the properties of the CES materials, it is additionally possible to fuse multiple optical relays within the mosaic together.

Figure 7B:
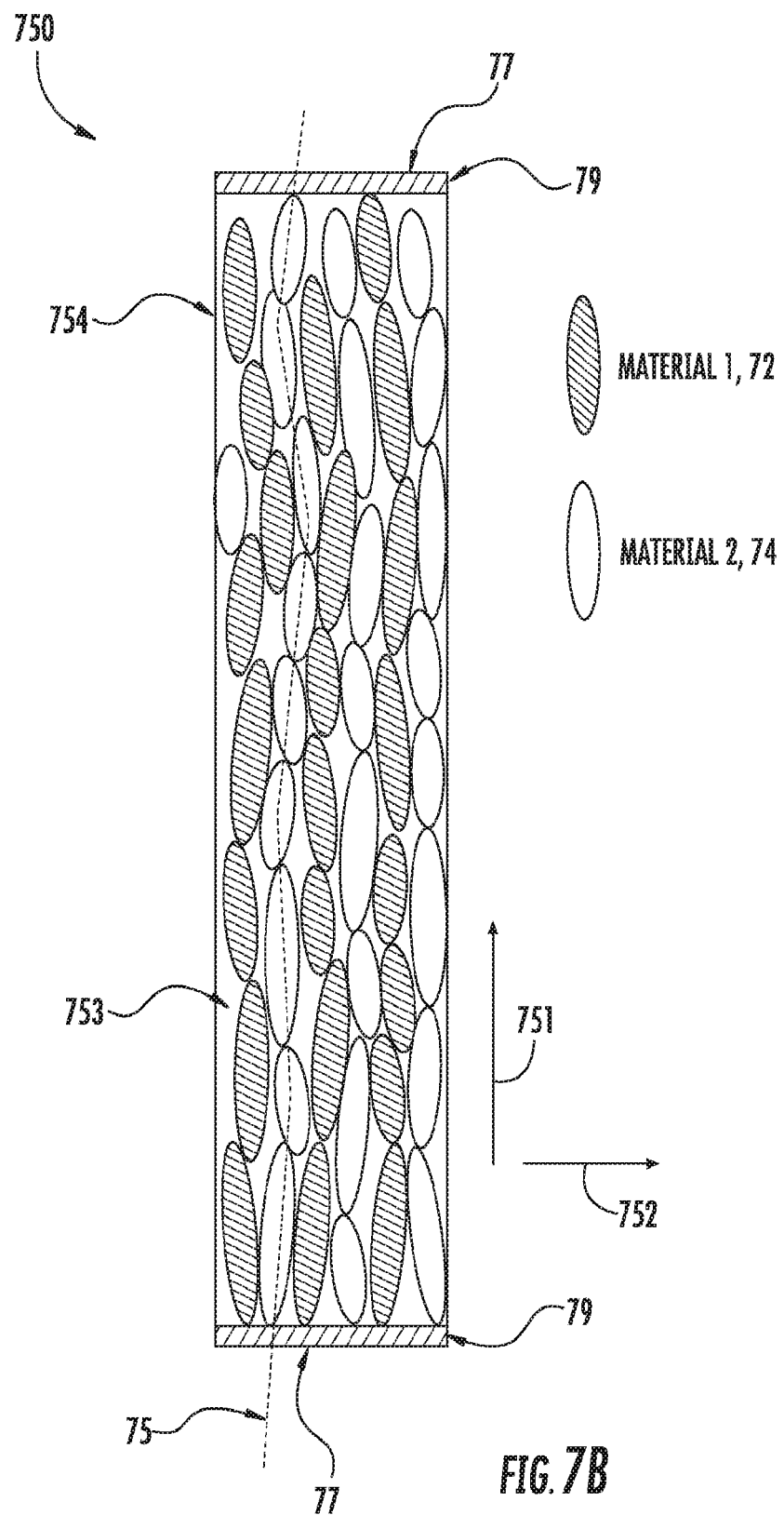
FIG. 7B illustrates a cutaway view of a rigid energy relay which achieves Transverse Anderson Localization by intermixing two component materials within a bonding agent, and in doing so, achieves a path of minimum variation in one direction for one critical material property, in accordance with one embodiment of the present disclosure.

FIG. 7B illustrates a cutaway view of a rigid implementation 750 of a CES Transverse Anderson Localization energy relay. CES material type 1 (72) and CES material type 2 (74) are intermixed with bonding agent 753 which matches the index of refraction of material 2 (74). It is possible to use optional relay end caps 79 to relay the energy wave from the first surface 77 to a second surface 77 within the enclosure 754. The CES material type 1 (72) and CES material type 2 (74) both have the engineered property of being elongated—in this embodiment, the shape is elliptical, but any other elongated or engineered shape such as cylindrical or stranded is also possible. Also shown in FIG. 7B is a path of minimum engineered property variation 75 along the longitudinal direction, which assists the energy wave propagation in this direction from one end cap surface 77 to the other end cap surface 77.

The initial configuration and alignment of the CESs can be done with mechanical placement, or by exploiting the EP of the materials, including but not limited to: electric charge, which when applied to a colloid of CESs in a liquid can result in colloidal crystal formation; magnetic moments which can help order CESs containing trace amounts of ferromagnetic materials, or relative weight of the CESs used, which with gravity helps to create layers within the bonding liquid prior to curing.

In one embodiment, for electromagnetic energy relays, the implementation depicted in FIG. 7B would have the bonding agent 753 matching the index of refraction of CES material type 2 (74), the optional end caps 79 would be solid optical relays to ensure that an image can be relayed from one surface of an end cap to the other, and the critical EP with minimal longitudinal variation would be refractive index, creating channels 75 which would assist the propagation of localized electromagnetic waves.

FIG. 7B depicts a method comprising: (a) providing one or more of a first CES, the first CES having a specific set of EPs $\{a_0, b_0, c_0 \ldots\}$; (b) providing one or more N CES, denoted $CES_i$, each having the corresponding EPs $\{a_i, b_i, c_i \ldots\}$, wherein i is 1 or greater; (c) forming a medium using the one or more of the first CES, and the one or more of the $CES_i$, the forming step randomizing at least one EP (across $a_0$ and $a_i$) along a first plane of the medium resulting in a variability of that EP (across $a_0$ and $a_i$) denoted V1, with the combined EP values of a different type ($b_0$ and $b_i$) inducing the spatial variability of the same EP (across $a_0$ and $a_i$) along a second plane of the medium, this variability denoted V2, wherein the second plane is different from the first plane, and wherein the variability in this second plane V2 is lower than the variability V1; and (d) forming an assembly using the medium such that the first plane of the medium is the transverse orientation 752 of the assembly and the second plane of the medium is the longitudinal orientation 751 of the energy relay assembly, wherein energy waves propagating to or from an entrance to an exit of the energy relay assembly have higher transport efficiency in the longitudinal orientation 75I versus the transverse orientation 752 and are spatially localized in the transverse orientation 752 due to the engineered properties, and wherein the EP of each material as formed in the medium may facilitate the reduction of unwanted diffusion or scatter of energy waves through the assembly.

A method of forming a bi-directional transverse Anderson localization energy relays with engineered structures in view of FIGS. 7A-7B includes: (a) providing one or more of a first component engineered structure, the first component engineered structure having a first set of engineered properties, and (b) providing one or more of a second component engineered structure, the second component engineered structure having a second set of engineered properties, where both the first component engineered structure and the second component engineered structure have at least two common engineered properties, denoted by a first engineered property and a second engineered property.

Next, in this embodiment, the method includes (c) forming a medium using the one or more of the first component engineered structure and the one or more of the second component engineered structure, the forming step randomizes the first engineered property in a first plane of the medium resulting in a first variability of that engineered property in that plane, with the values of the second engineered property allowing for a variation of the first engineered property in a second plane of the medium, where the variation of the first engineered property in the second plane is less than the variation of the first engineered property in the first plane.

In one embodiment, the first engineered property that is common to both the first component engineered structure and the second component engineered structure is index of refraction, and the second engineered property that is common to both the first component engineered structure and the second component engineered structure is shape, and the forming step (c) randomizes the refractive index of the first component engineered structure and the refractive index of the second component engineered structure along a first plane of the medium resulting in a first variability in index of refraction, with the combined geometry of the shapes of the first component engineered structure and the second component engineered structure resulting in a variation in index of refraction in the second plane of the medium, where the variation of the index of refraction in the second plane is less than the variation of index of refraction in the first plane of the medium.

In one embodiment, the method further includes (d) forming an assembly using the medium such that the first plane of the medium extends along the transverse orientation of the assembly and the second plane of the medium extends along the longitudinal orientation of the assembly, where energy waves propagating through the assembly have higher transport efficiency in the longitudinal orientation versus the transverse orientation and are spatially localized in the transverse orientation due to the first engineered property and the second engineered property.

In some embodiments, the forming steps (c) or (d) includes forming the assembly into a layered, concentric, cylindrical configuration or a rolled, spiral configuration or other assembly configurations required for optical prescriptions defining the formation of the assembly of the one or more first component engineered structure and the one or more second component engineered structure in predefined volumes along at least one of the transverse orientation and the longitudinal orientation thereby resulting in one or more gradients between the first order of refractive index and the second order of refractive index with respect to location throughout the medium.

In other embodiments, each of the forming steps (c) and (d) includes at least one of forming by intermixing, curing, bonding, UV exposure, fusing, machining, laser cutting, melting, polymerizing, etching, engraving, 3D printing, CNCing, lithographic processing, metallization, liquefying, deposition, ink-jet printing, laser forming, optical forming, perforating, layering, heating, cooling, ordering, disordering, polishing, obliterating, cutting, material removing, compressing, pressurizing, vacuuming, gravitational forces and other processing methods.

In yet another embodiment, the method further includes (e) processing the assembly by forming, molding or machining to create at least one of complex or formed shapes, curved or slanted surfaces, optical elements, gradient index lenses, diffractive optics, optical relay, optical taper and other geometric configurations or optical devices.

In an embodiment, the properties of the engineered structures of steps (a) and (b) and the formed medium of step (c) cumulatively combine to exhibit the properties of Transverse Anderson Localization.

In some embodiments, the forming step (c) includes forming with at least one of: (i) an additive process of the first component engineered structure to the second component engineered structure; (ii) a subtractive process of the first component engineered structure to produce voids or an inverse structure to form with the second component engineered structure; (iii) an additive process of the second component engineered structure to the first component engineered structure; or (iv) a subtractive process of the second component engineered structure to produce voids or an inverse structure to form with the first component engineered structure.

In one embodiment, each of the providing steps (a) and (b) includes the one or more of the first component engineered structure and the one or more of the second component engineered structure being in at least one of liquid, gas or solid form. In another embodiment, each of the providing steps (a) and (h) includes the one or more of the first component engineered structure and the one or more of the second component engineered structure being of at least one of polymeric material, and where each of the first refractive index and the second refractive index being greater than 1. In one embodiment, each of the providing steps (a) and (b) includes the one or more of the first component engineered structure and the one or more of the second component engineered structure, having one or more of first component engineered structure dimensions differing in a first and second plane, and one or more of second component engineered structure dimensions differing in a first and second plane, where one or more of the structure dimensions of the second plane are different than the first plane, and the structure dimension of the first plane are less than four times the wavelength of visible light.

In an embodiment for visible electromagnetic energy relays, FIG. 7 depicts a method comprising: (a) providing one or more of a first CES with EP of a first refractive index $n_0$, first shape $s_0$, and first absorptive optical quality $b_0$; (b) providing one or more N CES, each CES/having refractive index $n_i$ shape and $s_i$, absorptive optical quality $b_i$, wherein i is 1 or greater; (c) forming a medium using the one or more of the first CES, and one or more of the $CES_i$, the forming step randomizing the first refractive index $n_0$ and the refractive index $n_i$ spatially along a first plane of the medium resulting in a first refractive index variability denoted V1, with the combined geometry of the shapes $s_0$ and $s_i$ inducing a second refractive index variability along a second plane of the medium denoted V2, wherein the second plane is different from the first plane, and wherein the second refractive index variability V2 is lower than the first refractive index variability V1; and (d) forming an assembly using the medium such that the first plane of the medium is the transverse orientation of the assembly and the second plane of the medium is the longitudinal orientation of the assembly, wherein energy waves propagating to or from an entrance to an exit of the assembly have higher transport efficiency in the longitudinal orientation versus the transverse orientation as well as are spatially localized in the transverse orientation due to the engineered properties and the resultant refractive index variability, and wherein the reflective, transmissive and absorptive optical quality of each material as formed in the medium may facilitate the reduction of unwanted diffusion or scatter of electromagnetic waves through the assembly.

In an embodiment for visible electromagnetic energy relays, one or more of the providing steps (a) and (b) may include the one or more of the first component engineered structure and the one or more of the $N_i$ structure being an additive process including at least one of bonding agent, oil, epoxy, and other optical grade, adhesive materials or immersion fluids.

In an embodiment, the forming step (c) may include forming the medium into a non-solid form, and wherein the forming step (d) includes forming the assembly into a loose, coherent waveguide system having a flexible housing for receiving the non-solid form medium.

In an embodiment, the forming step (c) may include forming the medium into a liquid form, and wherein the forming step (d) includes forming the assembly by directly depositing or applying liquid form medium.

In an embodiment, the forming steps (c) and (d) may include combining two or more loose or fused mediums in varied orientations for forming at least one of multiple entries or multiple exits of the assembly.

In an embodiment, the properties of the engineered structures and the formed medium may cumulatively combine to exhibit the properties of Transverse Anderson Localization and the forming step may include forming with at least one of: an additive process of the first component engineered structure to the second component engineered structure; a subtractive process of the first component engineered structure to produce voids or an inverse structure to form with the second component engineered structure; an additive process of the second component engineered structure to the first component engineered structure; or a subtractive process of the second component engineered structure to produce voids or an inverse structure to form with the first component engineered structure.

In an embodiment, one or more of the providing steps may include the one or more of the first component engineered structure and the one or more of the second component engineered structure being in at least one of liquid, gas or solid form.

In an embodiment for visible electromagnetic energy relays, one or more of the providing steps may include the one or more of the first component engineered structure and the one or more of the second component engineered structure being of at least one of polymeric material, and wherein each of the first refractive index and the second refractive index being greater than 1.

In an embodiment, one or more of the providing steps may include the one or more of the first component engineered structure and the one or more of the second component engineered structure, having one or more of first component engineered structure dimensions differing in a first and second plane, and one or more of second component engineered structure dimensions differing in a first and second plane, wherein one or more of the structure dimensions of the second plane are different than the first plane, and the structure dimension of the first plane are less than four times the wavelength of the relayed energy.

In an embodiment, one or more of the forming steps may include forming the assembly into a layered, concentric, cylindrical configuration or a rolled, spiral configuration or other assembly configurations required for functional prescriptions defining the formation of the assembly of the one or more first CES and the one or more second CES in predefined volumes along at least one of the transverse orientation and the longitudinal orientation thereby resulting in one or more gradients of one or more EPs of the CESs used with respect to location throughout the medium.

In an embodiment for visible electromagnetic energy relays, the forming steps may yield a configuration required for optical prescription of focus, beam steering, diffraction, or the like, through the generation of one or more gradients of refractive index with respect to location in the medium.

In an embodiment, one or more of the forming steps may at least one of forming by intermixing, curing, bonding, UV exposure, fusing, machining, laser cutting, melting, polymerizing, etching, engraving, 3D printing, CNCing, lithographic processing, metallization, liquefying, deposition, ink-jet printing, laser forming, optical forming, perforating, layering, heating, cooling, ordering, disordering, polishing, obliterating, cutting, material removing, compressing, pressurizing, vacuuming, gravitational forces, and other processing methods.

In an embodiment for visible electromagnetic energy relays, the method may further comprise processing the assembly by forming, molding or machining to create at least one of complex or formed shapes, curved or slanted surfaces, optical elements, gradient index lenses, diffractive optics, optical relay, optical taper and other geometric configurations or optical devices.

Figure 8:
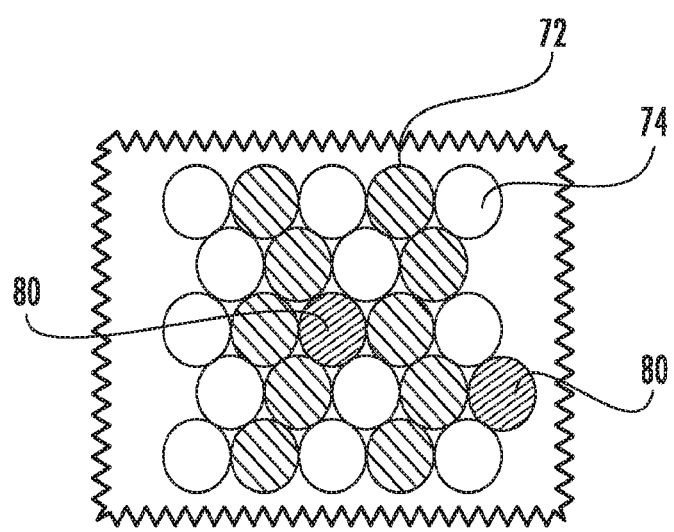
FIG. 8 illustrates a cutaway view in the transverse plane the inclusion of a DEMA (dimensional extra mural absorption) material in the longitudinal direction designed to absorb energy, in accordance with one embodiment of the present disclosure.

In an embodiment for visible electromagnetic energy relays. FIG. 8 illustrates a cutaway view in the transverse plane the inclusion of a DEMA (dimensional extra mural absorption) CES, 80, along with CES material types 72, 74 in the longitudinal direction of one exemplary material at a given percentage of the overall mixture of the material, which controls stray light, in accordance with one embodiment of the present disclosure for visible electromagnetic energy relays.

The additional CES materials that do not transmit light are added to the mixture(s) to absorb random stray light, similar to EMA in traditional optical fiber technologies, only the absorbing materials are included within a dimensional lattice and not contained within the longitudinal dimension, herein this material is called DEMA, 80. Leveraging this approach in the third dimension provides far more control than previous methods of implementation where the stray light control is much more fully randomized than any other implementation that includes a stranded EMA that ultimately reduces overall light transmission by the percent of the area of the surface of all the optical relay components, whereas the DEMA is intermixed in the dimensional lattice that effectively controls the light transmission in the longitudinal direction without the same reduction of light in the transverse. The DEMA can be provided in any ratio of the overall mixture. In one embodiment, the DEMA is 1% of the overall mixture of the material. In a second embodiment, the DEMA is 10% of the overall mixture of the material.

In an additional embodiment, the two or more materials are treated with heat and/or pressure to perform the bonding process and this may or may not be completed with a mold or other similar forming process known in the art. This may or may not be applied within a vacuum or a vibration stage or the like to eliminate air bubbles during the melt process. For example, CES with material type PS and PMMA may be intermixed and then placed into an appropriate mold that is placed into a uniform heat distribution environment capable of reaching the melting point of both materials and cycled to and from the respective temperature without causing damage/fractures due to exceeding the maximum heat elevation or declination per hour as dictated by the material properties.

For processes that require intermixing materials with additional liquid bonding agents, in consideration of the variable specific densities of each material, a process of constant rotation at a rate that prevents separation of the materials may be required.

Figure 9:
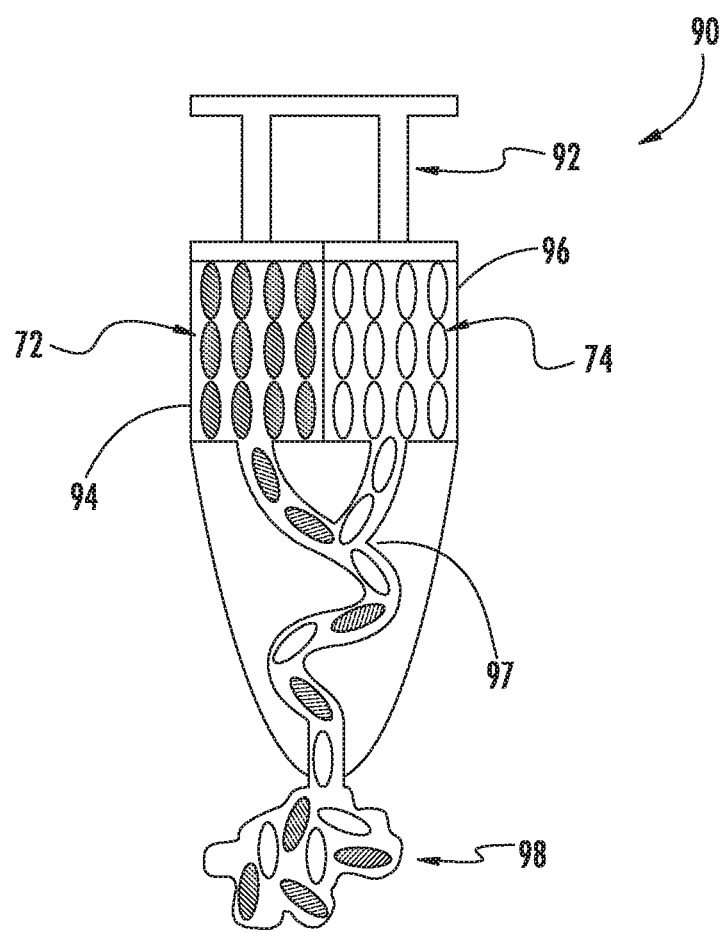
FIG. 9 illustrates a method to intermix one or more component materials within a two-part system, in accordance with one embodiment of the present disclosure.

FIG. 9 illustrates one such method 90 to intermix one or more CES material types 72, 74 within a two part mixture 98 independently with each of the solutions 72, 74 at the optimum ratios within a system where the nozzles from chambers 94, 96 of each separate mixture meets at a central point 97 to appropriately mix each part of the CES mixture 98 together to form an ideal ratio of CES and bonding agent to allow for appropriate curing with all required engineered property ratios maintained within a single apparatus, in accordance with one embodiment of the present disclosure. A linked plunger 92 provides the ability to mix these materials 72, 74 together simultaneously without the additional need for measurements or mixture.

An additional embodiment includes the ability to use a two-part mixture where each liquid contains one or more of CES materials individually such that when mixed together, all materials are provided in the correct and appropriately saturated ratios. In one specific embodiment, both intermixed materials are placed side by side with linked plungers or other methods for applying even pressure, and nozzles forcing both parts of the mixture to mix with even proportions such that when the plunger or other method for producing the pressure to mix both materials together is activated, the effective mixture includes the exact amount of each CES material as well as the appropriate mixture of the two-part medium.

An additional embodiment provides the ability to create multiple bonded, formed, produced or otherwise materials and use chemical, heat or the like processes to fuse or bond these individual elements together as if they had been produced simultaneously without separate processes to facilitate mechanical requirements and practical processes.

Figure 10:
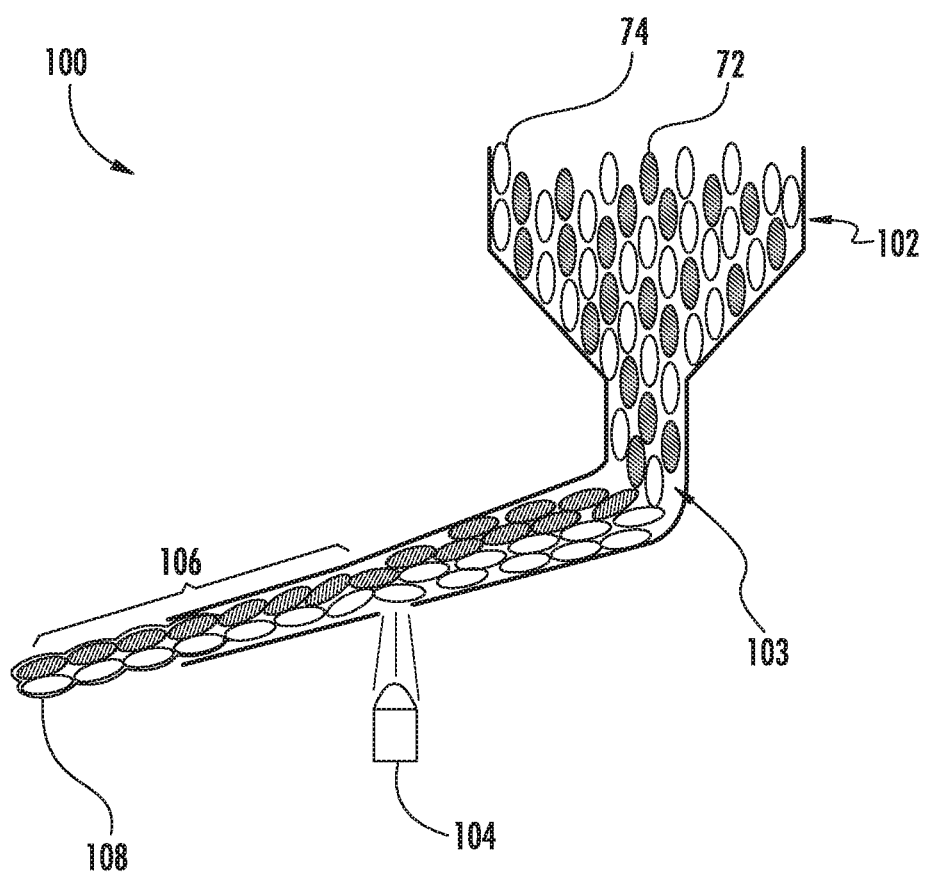
FIG. 10 illustrates an implementation of a process where a mixture of component materials and UV sensitive bonding agents are intermixed together and form transversely disordered and longitudinally ordered threads of material, in accordance with one embodiment of the present disclosure.

FIG. 10 illustrates a process 100 wherein a mixture of CESs 72, 74 and UV sensitive bonding agents 103 are intermixed together in a mixing chamber 102 and an apparatus controls the release of the mixture of the materials through a nozzle with a predetermined diameter and a high intensity UV laser 104 is focused on the solution near the exit of the nozzle where arbitrarily long threads 108 of the solid cured material 106 may be formed wherein the longitudinal orientation of the thread exhibits CES ordering and the transverse orientation of the threads exhibits CES disordering, in accordance with one embodiment of the present disclosure.

An additional embodiment provides the ability to cure the mixture of CES material types 72, 74 using epoxy or another bonding agent to include chemicals, heat or the like, and rapidly cure thin strands of the mixture maintaining the longitudinal ordering and transverse disordering at any desired diameter of thickness such that a single strand with any length may be produced. An exemplary application of this includes a UV fast-cure epoxy intermixed with the appropriate ratio of CES material type 1 (72) and CES material type 2 (74) and a nozzle that distributes the mixture at the appropriate diameter facilitated by a constant pressure for the controlled release of the mixture wherein the high intensity UV laser 104 is focused at the exit of the mixture such that upon contact with the UV light, a solid is formed and the constant pressure of the material exiting the nozzle produces an arbitrary length strand of the material. This process may be performed with any method required to cure including time, temperature, chemicals and the like. FIG. 10 illustrates one exemplary implementation of this process. It should be noted that many of these materials exhibit limited sensitivity to UV light, so that either extremely high intensities are required for fast cure, or other implementations are introduced to perform this function depending on the materials leveraged in the mixture.

In an embodiment of the above, multiple strands are collected together and fused together through methods known in the art including light, time, temperature, chemicals and the like.

An additional embodiment uses no additional bonding agents. This may or may not be implemented in the presence of a gas or liquid in order to maintain a loose 'sand-like' mixture of the CESs 72, 74 without the introduction of air, but rather a different gas/liquid that may be more appropriate to encourage the propagation of energy according to the transverse Anderson localization principle. This may include one or more additional CES materials and may include one or more gasses/liquids.

This application may be performed within a vacuum or a sealed environment. With any implementation methodology, the randomization of CESs is significantly increased from that of other implementations that are the current state of the art forming significantly increased disordering in the final structure. Whether the liquid bonding material cures into a solid or remains liquid, a three-dimensional lattice of CESs are created with a geometry consistent with increased Transverse Anderson Localization of longitudinal energy waves as discussed previously.

There may be advantages of this approach where CES materials can be effectively produced and mixed cost effectively and in bulk quantities without the necessity for any custom fabrication processes required to arrange the material into an intermediate form factor.

Further, for processes that involve solid structures, the ability to form structures through molds or the like is extremely powerful for increased efficiency of production and can result in sizes and shapes that were previously not possible. It is also possible to premix the bonding agents with the CESs and can be painted onto any surface or a plethora of other potential implementation methodologies.

Figure 11A:
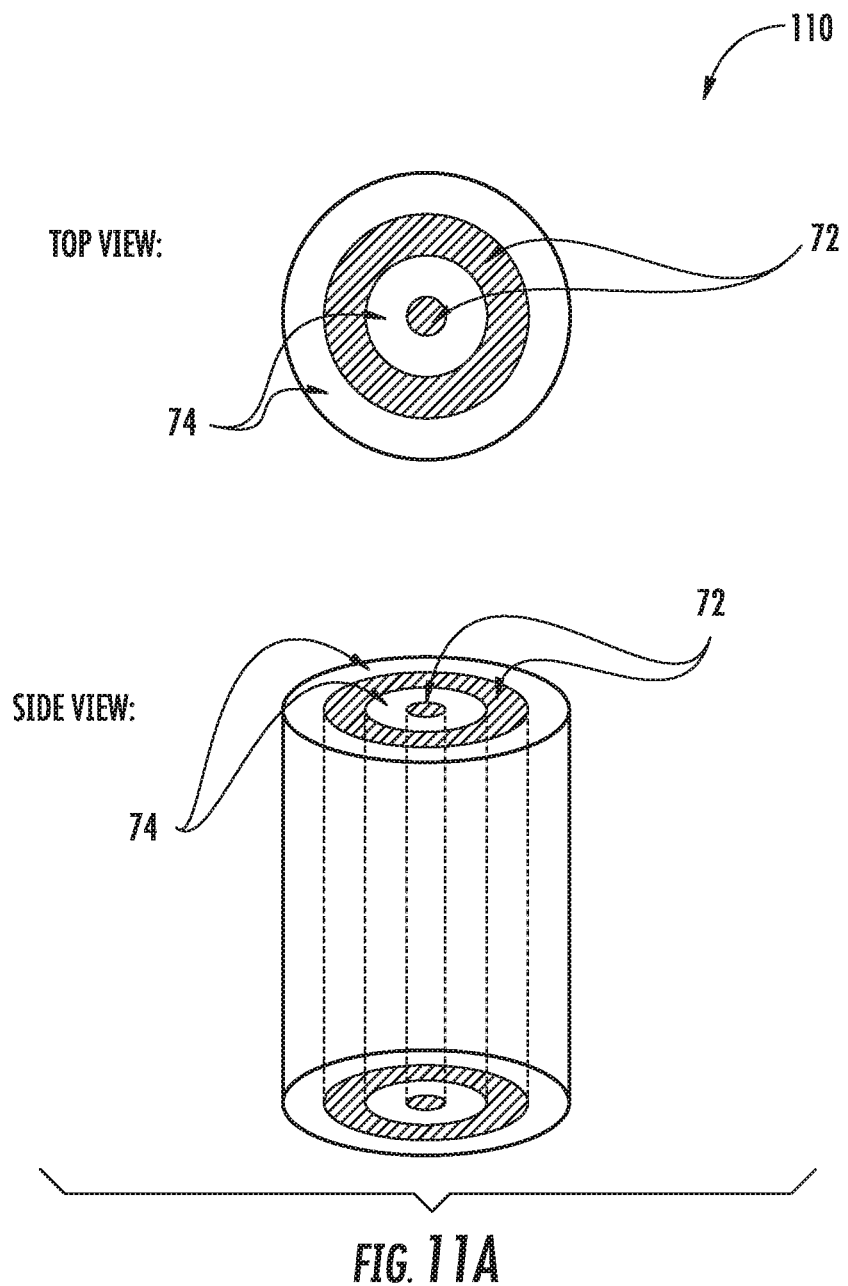
FIG. 11A illustrates a top view and a side view of a radially symmetric energy relay building block with two alternating component materials, in accordance with one embodiment of the present disclosure.

FIG. 11A illustrates a radially symmetric cylindrical building block 110 composed of two alternating layers of CESs 72, 74, in accordance with one embodiment of the present disclosure.

In an embodiment for visible electromagnetic energy relays, it is possible to fabricate diffractive, refractive, gradient index, binary, holographic or Fresnel-like structures by generating alternating layers of radially symmetric and non-uniform thicknesses of CESs 72, 74 with, for example, a refractive index difference of approximately 0.1. This value can vary depending on optical configuration. The fabrication process of such an element may leverage the principles of Transverse Anderson Localization or may leverage the techniques provided in this discussion to produce two materials without explicit randomization. The prescription for these elements may vary spatially in either the transverse or longitudinal orientations and may include machined surface profiles or non-uniform spacing between individual layers.

One such method provides the ability to simply cure bonding materials with two or more differentiated EP's in an alternating methodology such that each layer forms around a previously cured region and grows radially to a defined diameter. This diameter may be constant, variable, or random depending on the requirements for the system. The cylinders can be used as building blocks for more complex structures.

It is possible to build substructures of one or more CES by employing the properties of a transient biaxial material such as, but not limited to, biaxial polystyrene, where the molecules are frozen by rapid cooling into stretched positions. Heating the material above a transition temperature will deactivate the transient state, causing the material to shrink, sometimes by a factor of two or more. The method comprises (a) providing one or more CES, (b) forming a medium by at least one of an additive, subtractive, or isolated process, the additive process includes adding at least one CES to a transient structure, the subtractive process includes producing voids or an inverse structure in a transient structure to later form with at least one CES, and the isolated process includes engineering at least one transient structure in the absence or removal of addition of a CES, and (c) forming an assembly and deactivating the transient material inducing an increase of material property variation along a first plane of an assembly relative to a decrease of material property variation along a second plane of an assembly to achieve Transverse Anderson Localization.

Figure 11B:
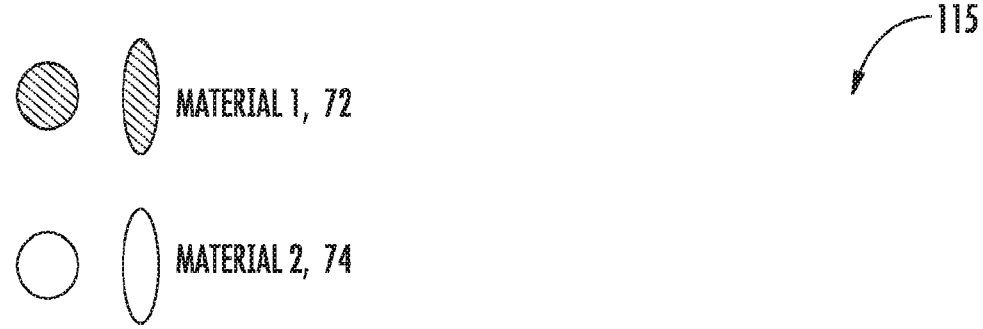
FIG. 11B illustrates a side view of a region within a biaxially tensioned material filled with two component materials that are spherical in shape before tension release and elongated in shape after tension release, a process which preserves the overall ordering of the materials.
Figure 11B:
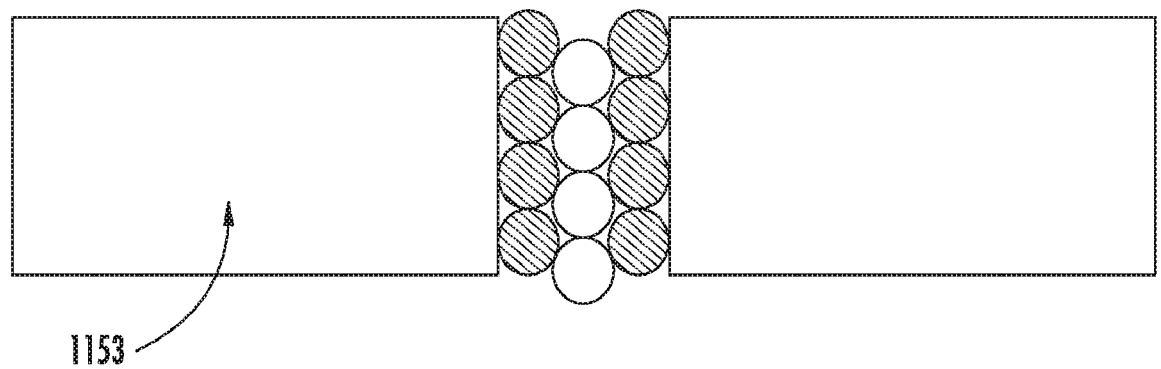
Figure 11B:
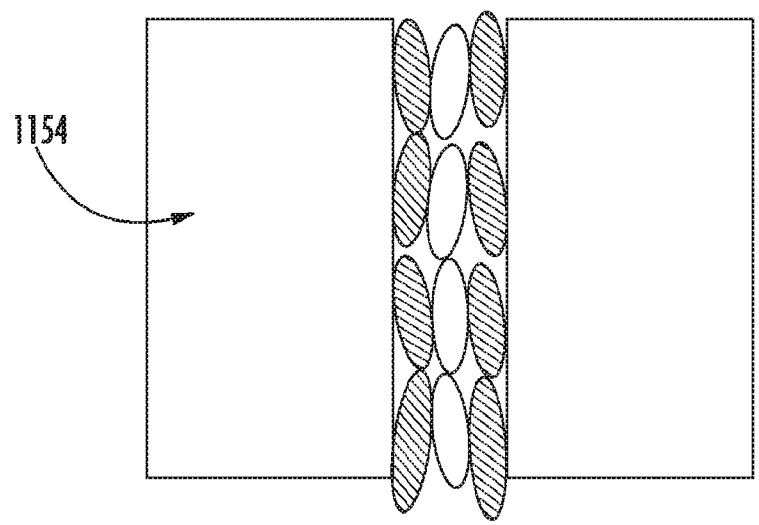

FIG. 11B shows the subtractive process 115 in which material is removed from a biaxial material and two CES materials 72, 74 are added to a hole in a biaxially stretched material 1153, where there may or may not be a bonding agent applied. The CESs 72, 74 may be simple microspheres that are commercially available but each exhibit at least one critical EP. With relaxation of the biaxial material 1154 after bringing the entire system near the melting point of all materials within the biaxial material, and contraction of the hole, the CES's 72, 74 dimensions become elongated in one direction, and contracted in the other. Further, the spatial ordering of CESs 72, 74 has been slightly randomized but essentially preserved in such a way that the variation in EP is much less along the direction of the elongation than in any orthogonal direction.

In an additional embodiment of FIG. 11B, the biaxially stretched material is subtractively formed to produce a plurality of holes with a first average diameter and a first average density spacing, and then two CESs 72, 74 are added before or after relaxing the biaxial material to result in a second average diameter and a second average density spacing, wherein the second average density spacing is significantly increased from the first average density spacing and the second average diameter is significantly lower than the first average diameter, and the thickness of the formed medium has increased resulting in decreased variation in the EP in the longitudinal orientation.

In an embodiment, the method may further comprise (d) generating several assemblies of step (c) with different EPs such as dimensions, size, refractive index, and volume, and generating several compound formed medium from step b; (e) pairing an assembly and a compound-formed medium together to form a unit collectively called a sub-structure, where one or more sub-structures can have one or more EP variations for a first and second plane; (f) generating additional variation with the addition of one or more N CES, each denoted $CES_i$ where i is 1 or greater, (g) forming a medium of one or more sub-structures and $CES_i$, where the forming step randomizes one critical EP parameter $EP_c$ (such as index of refraction for the embodiment of electromagnetic waves), along the one or more sub-structure's first plane resulting in a first compound medium $EP_c$ variability, with a different EP (such as shape) inducing a second compound medium $EP_c$ variability along the one or more sub-structure's second plane, wherein the one or more sub-structure's second plane is different from the one or more sub-structure's first plane, and wherein the second compound medium $EP_c$ variability is lower than the first compound medium $EP_c$ variability due to the one or more sub-structure EP and the $CES_i$ engineered property; and (h) forming a compound assembly using the compound medium such that the one or more sub-structure's first plane is the transverse orientation of the compound assembly and the one or more sub-structure's second plane is the longitudinal orientation of the compound assembly, wherein energy waves propagating to or from an entrance to an exit of the compound assembly have higher transport efficiency in the longitudinal orientation versus the transverse orientation and are spatially localized in the transverse orientation due to the compound engineered properties and the resultant compound $EP_c$ variability.

In an embodiment, step (c) or step (h) may include heating or other form of processing to deactivate the transient molecular state of the materials within the assembly, wherein the arrangement, density, and EP of the transient materials are varied in at least one of the transverse orientation or the longitudinal orientation, thereby causing the assembly during heat treatment or other processing to naturally taper or cause dimensional variations along at least one of the transverse orientation or the longitudinal orientation of the assembly to produce various energy relay geometries that would have otherwise required complex manufacturing processes that maintain the appropriate ordering for energy wave transport efficiency.

Figure 12:
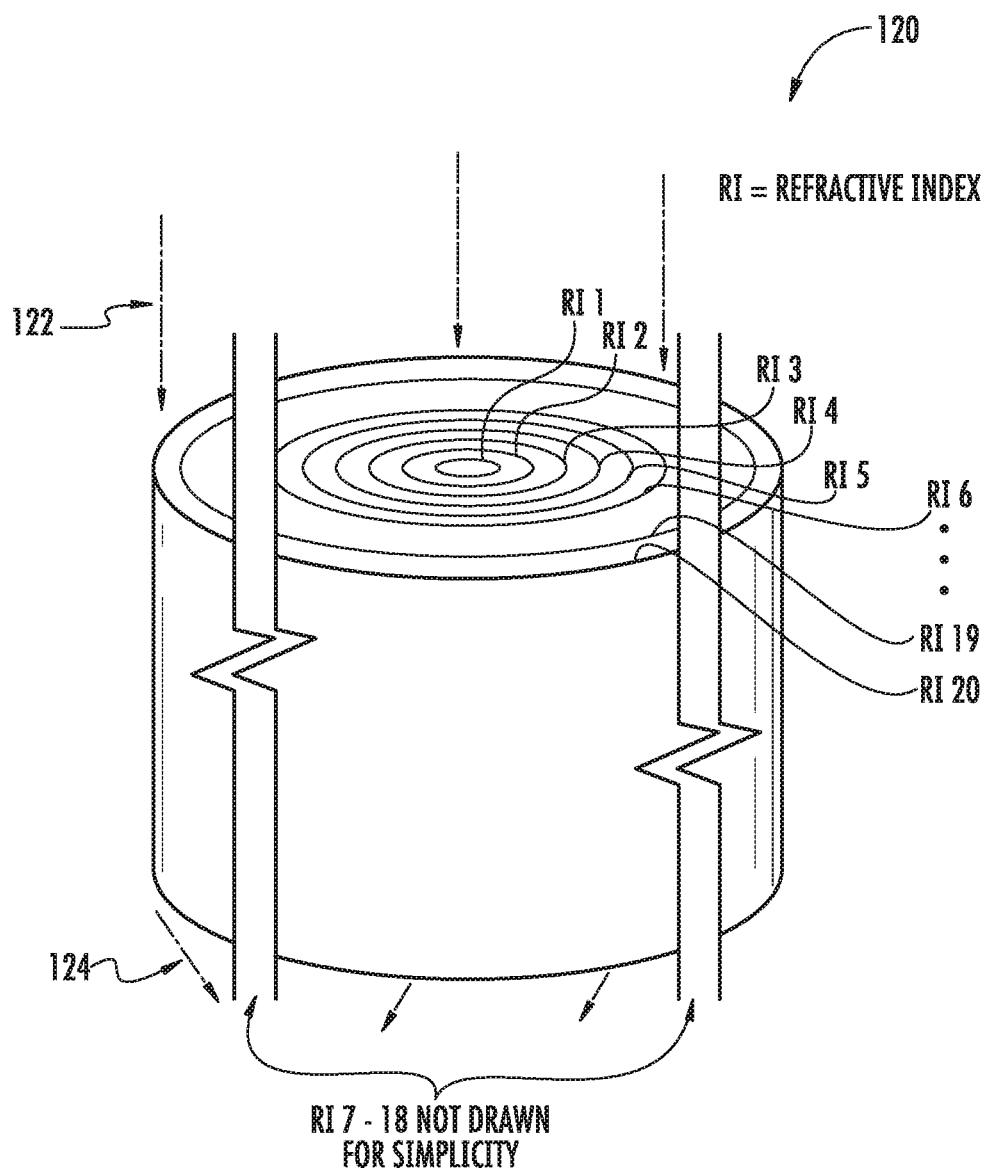
FIG. 12 illustrates a perspective view of a relay formed with multiple component materials implemented such that there is an input ray and an output ray that alters as a function of the property of each of the materials contained within the energy relay, in accordance with one embodiment of the present disclosure.

FIG. 12 illustrates a perspective view 120 of a cylindrical structure with 20 layers of different CESs, where one or more critical EPs may vary from layer to layer, and where layers may vary in thickness. The structure can be built to implement a steering of the energy wave through the material.

In an embodiment for visible electromagnetic energy relays, it is possible to leverage multiple materials with multiple refractive indices that may or may not be of the same thickness per region as the material radiates from the center of the optical material. With this method, it is possible to leverage the optical properties of the material to alter steer angles of light in predetermined ways based upon the material properties per designed region. FIG. 12 illustrates one such embodiment wherein 20 materials with different refractive indices RI1-RI20 are implemented such that there is an input ray 122 and an output ray 124 that alters as a function of the EP of each of the materials contained within the optical relay element.

The structure of FIG. 12 can be built up in layers. The outside surface of each of the previously layered materials can be coated with a $CES_i$ layer with a dimension at or below the desired thickness of each radial layer in combination with a bonding material with the appropriate set of EPs. When the bonding agent is nearly cured and tacky to the touch, the next layer may be formed by applying the next $CES_{i+1}$ layer as a coat to the previous bonding agent layer until dry. It is also a potential implementation that this manufacturing process requires constant rotation of the optical build up to ensure a consistent radially concentric structure is formed.

In an embodiment for visible electromagnetic energy relays, the critical engineered property is refractive index (RI), and the CESs are leveraged with alternating RIs to coat the outside of each of the previously layered materials with a shape diameter at or below the desired thickness of each radial layer in combination with a bonding material of (near) identical RI properties. When the bonding agent is nearly cured and tacky to the touch, the next layer of a second (or greater) RI material is applied to coat the previous bonding agent with a new layer until dry. It is also a potential implementation that this manufacturing process requires constant rotation of the optical build up to ensure a consistent radially concentric structure is formed and the structure begins with a center optical 'core' matching one of the two materials with the same or similar thickness to the desired thickness per radial layer. By applying the matched RI bonding agent to each microsphere layer, the CES effectively become optically transparent spacers and the bonding agent is used to consistently form a material for the next concentric layer to bond to. In one such embodiment, each microsphere is approximately 1 µm in diameter with a first RI of 1.49 and a first bonding agent with RI of 1.49 and a second microsphere with a second RI of 1.59 and a second bonding agent with an RI of 1.59 and the complete diameter of the constructed radially concentric materials forms a 60 mm diameter optical material.

In a further embodiment of the previously disclosed radially concentric microsphere build up methodology, a second approach is described wherein the bonding agents are of the second (or more) RI to form a disordered Anderson localization approach vs the previously disclosed ordered approach. In this fashion, it is possible to then randomize the transmission of the rays of light to increase the theoretical resolution of the optical system.

Figure 13:
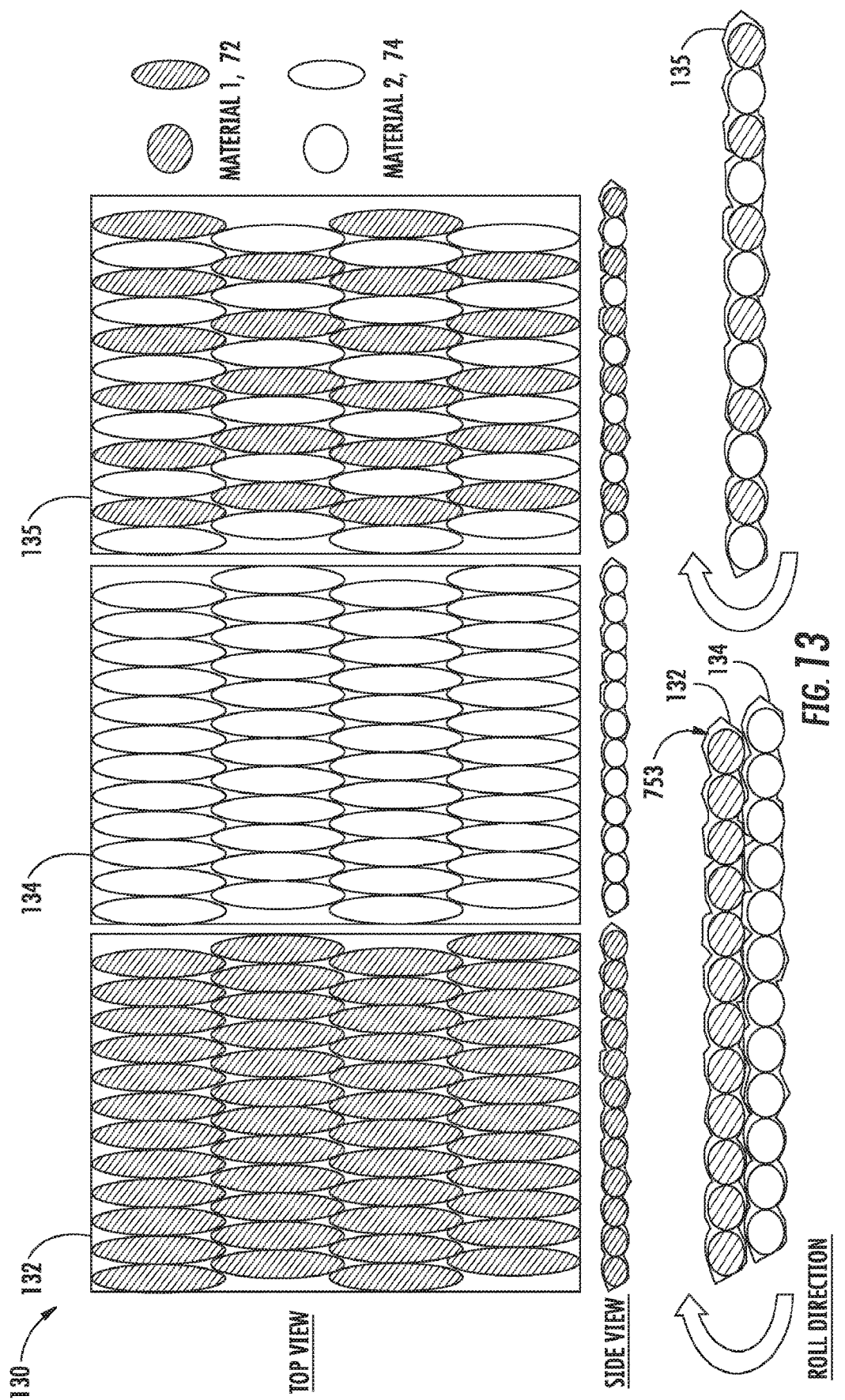
FIG. 13 illustrates perspective views of a process that generates an energy relay by starting with sheets of aligned component materials, using two sheets each with one type of material or one sheet with two types of component materials and then using these sheets as building blocks to roll together into a spiral structure, forming an energy relay, in accordance with one embodiment of the present disclosure.

FIG. 13 illustrates perspective views for a spiral production process 130 which leverages sheets of two CESs 72, 74, in accordance with one embodiment of the present disclosure. A CES material type 72 or 74 is arranged to lie end-to-end and then bonded into sheets 132 or 134, respectively, and produced with a predetermined thickness. An additional methodology involves a spiral fabrication process where sheets 132 and 134 are layered and bonded together to form a single sheet 753 that has a first set of critical EPs on one side and a second set of critical EPs on the other side. These materials are then rolled in a spiral until a specified diameter is reached leveraging various mechanical and/or fabrication methods to produce the resultant energy relay geometry.

In an embodiment for visible electromagnetic energy relays, the spiral approach involves the use of CESs with a predetermined thickness and a bonding agent the same RI as one of the two CESs 72, 74 to form sheets of intermixed CESs and bonding agents wherein the CESs are leveraged to determine sheet thickness and the bonding agents are leveraged to hold the CESs together in a flexible sheet, but not to exceed the desired thickness of the individual layers. This is repeated for a second (or more) CES with a second RI.

Once the individual sheets are fabricated at a predetermined length (the length of each of the resultant energy relay elements) and width (the end thickness or diameter after spiraling both materials together), a thin layer of the bonding agent with one or more critical EPs referred to as EP 1 is applied to 132, followed by the mating of 134 to align to 132 without the bonding agent being allowed to cure. 134 then has a bonding agent with one or more EPs referred to as EP 2 applied in a thin layer on top of the assembly and not yet cured. The resulting stack of 132, bonding agent with EP 1, 134, and bonding agent with EP 2 is then rolled in a spiral to form the resulting energy relay element, and through this process any excess bonding agent material is forced out of either of the two open ends before final curing.

It is additionally possible for any of the above methods to produce the sheets in a non-uniform thickness to provide a variable thickness to the concentric rings for specific functional purposes.

In an embodiment for visible electromagnetic energy relays, where the critical engineered property is refractive index, it is possible to calculate the directionality of each optical ray through a determined thickness of produced material, and then determine the relative thickness for the concentric rings to steer certain rays at certain angles depending on the optical requirements. A wedge approach to the sheet will result in a constantly increasing thickness to each radial ring, or a non-uniform thickness across the sheet will produce random changes in thickness of the radial rings.

As an alternative to creating two sheets, each one containing a single CES and a single bonding agent, a single sheet layer 135 can be created which contains two or more CESs 72, 74 arranged in an interlaced end-to-end configuration 135 as shown in FIG. 13. A bonding agent with EP 1 is used to hold the two materials together. The same bonding agent, or a different one with EP 2, can be applied to the sheet when it is rolled into a spiral to form the resulting energy relay element, and through this process any excess bonding agent material is forced out of either of the two open ends.

An additional method of the above where the same process is followed, but the sheets are made of mismatched CES material type 1 to bonding agent material 2 and vice versa to encourage the Transverse Anderson Localization phenomena.

An embodiment for visible electromagnetic energy relays exists for all of the above radially symmetrical or spiraled optical materials where the optical elements that are formed are sliced into thin cylinders, and may be aligned in an array, as implementations of a diffractive lens that allow for the appropriate steering of the rays of light as required for a specific optical configuration.

Figure 14:
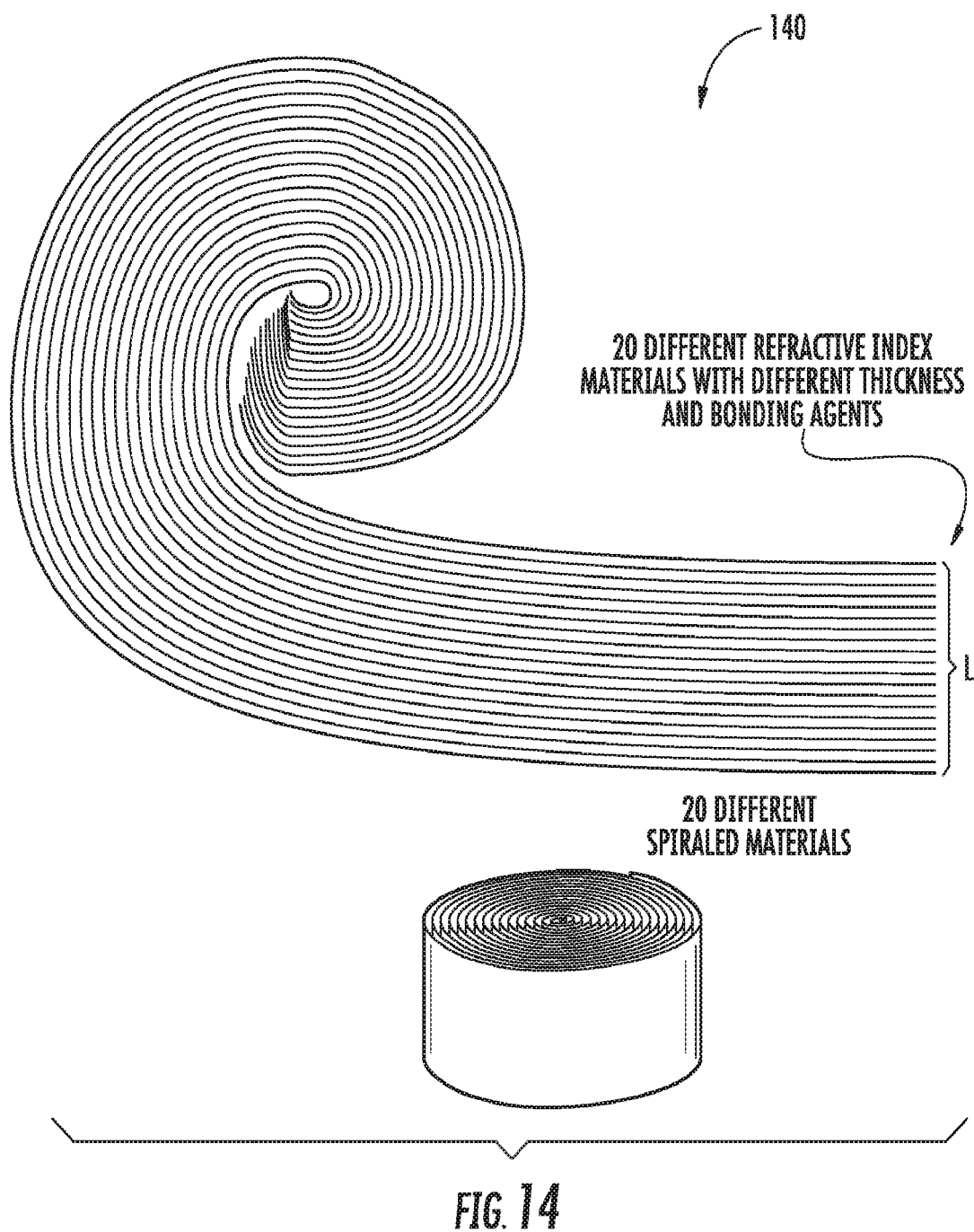
FIG. 14 illustrates perspective views of a repeating pattern of 20 component materials each with one or more EPs with a thickness that may or may not be the same per sheet spiraled into an energy relay structure there is an input ray angle and an output ray angle that is a result of the differing EP of each region of material, in accordance with one embodiment of the present disclosure.

FIG. 14 illustrates perspective views of a repeating pattern 140 of twenty CESs with a thickness that may or may not be the same per sheet spiraled into an energy relay structure wherein there is an input wave angle and an output wave angle that is a result of one or more differing EP of each region of material, in accordance with one embodiment of the present disclosure.

In an embodiment for visible electromagnetic energy relays, 140 contains twenty refractive indices applied with thicknesses that may or may not be the same per sheet spiraled into an optical relay structure that is able to steer an electromagnetic wave as a result of the differing refractive index of each region of material, in accordance with one embodiment of the present disclosure.

In an additional embodiment for visible electromagnetic energy relays, the refractive index of the material changes as a specific function of radius from the center of the spiral. In this fashion, it is possible to fabricate a plurality of sheets of material as identified previously with a sequence of refractive indices as designed for a specific optical function for steering rays of light through the optical relay element. This may additionally be placed into an array as previously disclosed or cut or polished or the like as discussed with other embodiments.

Further, it is possible to produce multiple optical elements from this spiral or radial process and bond/fuse these together with any of the methods previously disclosed or known in the art forming a singular surface with a determined optical element thickness, and then slice the entirety of the array into sheets for use on any Fresnel lenslet array or any other determined purpose.

The transverse diameter of one of the structures may be four times the wavelength of at least one of: (i) visible light and the material wave propagation property is the refractive index; or (ii) ultrasonic frequencies and the material wave propagation property is the acoustic impedance; or (iii) infrared light and the material wave propagation property is the refractive index; or (iv) acoustic waves, ultraviolet, x-rays, microwaves, radio waves, or mechanical energy.

In an embodiment, the transverse diameter of a first component engineered structure and a second component engineered structure may be designed for two different energy domains. The aspect ratio of one of the structures may be greater in the longitudinal than the transverse orientation. The plurality of structures may stack together in a partially overlapping and primarily longitudinal orientation. In an embodiment, a first component engineered structure may be engineered to exhibit a surface profile that is the inverse shape of a second component engineered structure, one of the structures may include voids, and one of the structures may be formed within the voids of a second component engineered structure.

In an embodiment, the mechanical external surfaces of the energy relay may be formed before or processed after manufacturing to exhibit planar, non-planar, faceted, spherical, cylindrical, geometric, tapered, magnified, minified, round, square, interlaced, woven, or other mechanical surface properties. In an embodiment, forming, molding or machining the energy relay creates at least one of complex or formed shapes, curved or slanted surfaces, optical elements, gradient index lenses, diffractive optics, optical relay, optical taper and other geometric configurations or optical devices. In an embodiment, two or more energy relays are attached together in an assembly, the resultant structure is fused or solid or loose or flexible.

In an embodiment, the energy relay comprises a first side and a second side, the second side having two or more third sides, and wherein the third sides propagate energy through the second side and combined through the first side.

In one embodiment, a device having Transverse. Anderson Localization property includes a relay element formed of one or more of a first structure and one or more of a second structure, the first structure having a first wave propagation property and the second structure having a second wave propagation property, the relay element configured to relay energy therethrough, where, along a transverse orientation the first structure and the second structure are arranged in an interleaving configuration with spatial variability, where, along a longitudinal orientation the first structure and the second structure have substantially similar configuration, and where energy is spatially localized in the transverse orientation and greater than about 50% of the energy propagates along the longitudinal orientation versus the transverse orientation through the relay element.

In another embodiment, the relay element includes a first surface and a second surface, and wherein the energy propagating between the first surface and the second surface travel along a path that is substantially parallel to the longitudinal orientation in some embodiments, the first wave propagation property is a first index of refraction and the second wave propagation property is a second index of refraction, where a variability between the first index of refraction and the second index of refraction results in the energy being spatially localized in the transverse orientation and greater than about 50% of the energy propagating from the first surface to the second surface.

In one embodiment, the energy passing through the first surface has a first resolution, where the energy passing through the second surface has a second resolution, and where the second resolution is no less than about 50% of the first resolution. In another embodiment, the energy with a uniform profile presented to the first surface passes through the second surface to substantially fill a cone with an opening angle of +/−10 degrees relative to the normal to the second surface, irrespective of location of the energy on the second surface.

In one embodiment, the first surface has a different surface area than the second surface, where the relay element further comprises a sloped profile portion between the first surface and the second surface, and where the energy passing through the relay element results in spatial magnification or spatial de-magnification. In another embodiment, each of the first structure and the second structure includes glass, carbon, optical fiber, optical film, polymer or mixtures thereof.

In some embodiments, both the first surface and the second surface are planar, or both the first surface and the second surface are non-planar, or the first surface is planar and the second surface is non-planar, or the first surface is non-planar and the second surface is planar, or both the first surface and the second surface are concave, or both the first surface and the second surface are convex, or the first surface is concave and the second surface is convex, or the first surface is convex and the second surface is concave.

In one embodiment, the device includes the first structure having an average first dimension along the transverse orientation that is less than four times the wavelength of the energy relayed therethrough, average second and third dimensions substantially larger than the average first dimension along second and third orientations, respectively, the second and third orientations substantially orthogonal to the transverse orientation, where the second wave propagation property has the same property as the first wave propagation property but with a different value, where the first structure and the second structure are arranged with maximum spatial variability in the transverse dimension such that the first wave propagation property and the second wave propagation property have maximum variation, where the first structure and the second structure are spatially arranged such that the first wave propagation property and the second wave propagation property are invariant along the longitudinal orientation, and where along the transverse orientation throughout the relay element, the center-to-center spacing between channels of the first structure varies randomly, with an average spacing between one and four times an average dimension of the first structure, and where two adjacent longitudinal channels of the first structure are separated by the second structure at substantially every location by a distance of at least one half the average dimension of the first structure.

In one embodiment, the relay element includes a first surface and a second surface, and where the energy propagating between the first surface and the second surface travel along a path that is substantially parallel to the longitudinal orientation. In another embodiment, the first wave propagation property is a first index of refraction and the second wave propagation property is a second index of refraction, where a variability between the first index of refraction and the second index of refraction results in the energy being spatially localized in the transverse orientation and greater than about 50% of the energy propagating from the first surface to the second surface.

In one embodiment, a system may include Transverse Anderson Localization energy relays with engineered structures incorporating the devices and relay elements described herein.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A device comprising:
   a relay element formed without a cladding and comprises one or more of a first component engineered structure and one or more of a second component engineered structure, the first component engineered structure and the second component engineered structure having different wave propagation properties;
   wherein, along a transverse orientation the first component engineered structure and the second component engineered structure are arranged in an interleaving configuration;
   wherein, along a longitudinal orientation, the first component engineered structure and the second component engineered structure each have a similar configuration;
   wherein the relay element relays energy along the longitudinal orientation through both the first component engineered structure and second component engineered structure, the energy being relayed is spatially localized in the transverse orientation;
   wherein the first component engineered structure is aligned such that energy is propagated through the first component engineered structure with a higher transport efficiency in the longitudinal orientation versus the transverse orientation; and wherein the second component engineered structure is aligned such that energy is propagated through the second component engineered structure with a higher transport efficiency in the longitudinal orientation versus the transverse orientation; and
   wherein the first component engineered structure and the second component engineered structure each have an average first dimension along the transverse orientation that is on the order of and up to four times the wavelength of the energy relayed therethrough.

2. The device of claim 1, wherein the relay element includes a first surface and a second surface, and wherein the energy propagating between the first surface and the second surface travels along a path that is substantially parallel to the longitudinal orientation.

3. The device of claim 2, wherein the first component engineered structure has a first index of refraction and the second component engineered structure has a second index of refraction, wherein a variability between the first index of refraction and the second index of refraction results in the energy being relayed being spatially localized in the transverse orientation and greater than about 50% of the energy propagating from the first surface to the second surface.

4. The device of claim 2, wherein the energy passing through the first surface has a first resolution, wherein the energy passing through the second surface has a second resolution, and wherein the second resolution is no less than about 50% of the first resolution.

5. The device of claim 2, wherein the energy with a uniform profile presented to the first surface passes through the second surface to substantially fill a cone with an opening angle of +1-10 degrees relative to the normal to the second surface, irrespective of location of the energy on the second surface.

6. The device of claim 2, wherein both the first surface and the second surface are planar.

7. The device of claim 2, wherein both the first surface and the second surface are non-planar.

8. The device of claim 2, wherein the first surface is planar and the second surface is non-planar.

9. The device of claim 2, wherein the first surface is non-planar and the second surface is planar.

10. The device of claim 2, wherein both the first surface and the second surface are concave.

11. The device of claim 2, wherein both the first surface and the second surface are convex.

12. The device of claim 2, wherein the first surface is concave and the second surface is convex.

13. The device of claim 2, wherein the first surface is convex and the second surface is concave.

14. The device of claim 1, wherein each of the first structure and the second structure includes glass, carbon, optical fiber, optical film, polymer or mixtures thereof.

\* \* \* \* \*